(12) United States Patent
Kim

(10) Patent No.: US 9,585,010 B2
(45) Date of Patent: Feb. 28, 2017

(54) VEHICLE, CONTROLLING METHOD THEREOF AND MULTIMEDIA APPARATUS INCLUDED THEREIN

(71) Applicant: HYUNDAI MOTOR COMPANY, Seoul (KR)

(72) Inventor: Jeong Hun Kim, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 51 days.

(21) Appl. No.: 14/676,529

(22) Filed: Apr. 1, 2015

(65) Prior Publication Data
US 2016/0119782 A1    Apr. 28, 2016

(30) Foreign Application Priority Data
Oct. 22, 2014    (KR) .................. 10-2014-0143164

(51) Int. Cl.
*H04M 3/42*    (2006.01)
*H04W 12/02*    (2009.01)
(Continued)

(52) U.S. Cl.
CPC .......... *H04W 12/02* (2013.01); *G06F 3/0416* (2013.01); *H04M 1/6083* (2013.01)

(58) Field of Classification Search
CPC ............... H04W 12/02; H04M 1/6083; H04M 3/42042; G06F 3/0416
(Continued)

(56) References Cited

U.S. PATENT DOCUMENTS 7,986,978 B2 * 7/2011 Katoh ................. H04M 1/6075
                                                     379/211.01
8,621,645 B1 * 12/2013 Spackman ............. G06F 21/62
                                                     726/26
(Continued)

FOREIGN PATENT DOCUMENTS

JP       10-203257 A      8/1998
JP     2004-140731 A      5/2004
(Continued)

OTHER PUBLICATIONS

Korean Office Action issued in corresponding Korean Patent Application No. 10-2014-0143164, mailed on Aug. 4, 2015; with English translation.

(Continued)

*Primary Examiner* — Mong-Thuy Tran
(74) *Attorney, Agent, or Firm* — McDermott Will & Emery LLP

(57) ABSTRACT

A vehicle includes a touchscreen configured to receive a touch input of a driver and display image information corresponding to the touch input, a passenger sensing unit configured to sense whether the passenger is present in the vehicle, a communication unit configured to communicate with a mobile terminal of the driver, and a controller configured to display a call request reception message and identification information of a third party when a call request is received from the third party via the mobile terminal and to provide an audio function of a hands-free service. When the passenger is sensed and the call request of the third party is received in a privacy mode, the controller displays the call request reception message and limits displaying of the identification information of the third party and the audio function.

22 Claims, 20 Drawing Sheets

(51) Int. Cl.
   *G06F 3/041* (2006.01)
   *H04M 1/60* (2006.01)
(58) Field of Classification Search
   USPC .................................. 455/415, 411; 726/26
   See application file for complete search history.

(56) References Cited

U.S. PATENT DOCUMENTS

| | | | | |
|---|---|---|---|---|
| 9,008,641 | B2* | 4/2015 | Yang | H04W 4/046 455/414.1 |
| 2004/0193910 | A1* | 9/2004 | Moles | G06F 21/84 726/27 |
| 2006/0074983 | A1* | 4/2006 | Jones | G06F 19/323 |
| 2007/0281753 | A1* | 12/2007 | Dobler | H04M 1/6075 455/569.1 |
| 2009/0100343 | A1* | 4/2009 | Lee | G06Q 10/10 715/733 |
| 2010/0041443 | A1* | 2/2010 | Yokota | H04M 1/6083 455/569.2 |
| 2010/0178915 | A1* | 7/2010 | Choi | H04W 36/385 455/426.1 |
| 2010/0210315 | A1* | 8/2010 | Miyake | H04L 12/587 455/569.2 |
| 2010/0210317 | A1* | 8/2010 | Kakehi | H04M 1/6091 455/569.2 |
| 2010/0273510 | A1* | 10/2010 | Herman | B60R 11/02 455/456.3 |
| 2011/0219423 | A1* | 9/2011 | Aad | G06F 21/00 726/1 |
| 2011/0248935 | A1* | 10/2011 | Mellow | G06F 1/1605 345/173 |
| 2013/0254874 | A1* | 9/2013 | Xu | G06F 21/32 726/17 |
| 2014/0094151 | A1* | 4/2014 | Klappert | H04M 1/6083 455/414.1 |
| 2014/0157424 | A1* | 6/2014 | Lee | G06F 21/74 726/26 |
| 2015/0033148 | A1* | 1/2015 | Kuchoor | G06F 17/241 715/753 |
| 2015/0100908 | A1* | 4/2015 | Magistrado | G06F 21/84 715/766 |

FOREIGN PATENT DOCUMENTS

| | | |
|---|---|---|
| JP | 2004-147037 A | 5/2004 |
| JP | 2005-236615 A | 9/2005 |
| JP | 2008-029728 A | 2/2008 |
| KR | 10-2004-0023338 A | 3/2004 |
| KR | 10-2014-0036899 | 3/2014 |

OTHER PUBLICATIONS

Notice of Patent Allowance issued in corresponding Korean Patent Application No. 10-2014-0143164, mailed on Jan. 4, 2016; with partial English translation.

* cited by examiner

VEHICLE, CONTROLLING METHOD THEREOF AND MULTIMEDIA APPARATUS INCLUDED THEREIN

CROSS-REFERENCE TO RELATED APPLICATION(S)

This application claims priority to Korean Patent Application No. 2014-0143164, filed on Oct. 22, 2014 in the Korean Intellectual Property Office, the disclosure of which is incorporated herein by reference.

BACKGROUND

1. Field

The present disclosure relates to vehicles capable of providing a hands-free function, multimedia apparatuses, and methods of controlling the same.

2. Description of the Related Art

In general, a vehicle is one of transportation apparatuses driving on a road or a railroad line by using fossil fuels, electricity, and the like, as a power source.

In recent years, vehicles are generally provided with an audio apparatus and a video apparatus to allow drivers to listen to music and watch videos while driving the vehicles in addition to simply transporting materials and manpower, and a navigation system displaying a route to a destination is also installed in the vehicles.

Furthermore, a multimedia apparatus in which an audio apparatus, a video apparatus, and a navigation system are integrated is installed in vehicles.

Also, the multimedia apparatus may provide a hands-free service, an audio streaming service, a video streaming service, and the like, via a communication network with a mobile terminal of a driver.

However, when a driver is accompanied by a passenger, telephone conversation contents of the driver may be exposed to the passenger during a hands-free service of the multimedia apparatus.

SUMMARY

It is an aspect of the present disclosure to provide vehicles capable of protecting driver's privacy, methods of controlling the same, and multimedia apparatuses.

Additional aspects of the disclosure will be set forth in part in the description which follows and, in part, will be obvious from the description, or may be learned by practice of the disclosure.

In accordance with one aspect of the present disclosure, a vehicle includes a touchscreen configured to receive a touch input of a driver and display image information corresponding to the touch input, a passenger sensing unit configured to sense whether a passenger is present in the vehicle, a communication unit configured to communicate with a mobile terminal of the driver, and a controller configured to display a call request reception message and identification information of a third party when a call request is received from the third party via the mobile terminal and to provide an audio function of a hands-free service. When presence of the passenger is sensed and the call request of the third party is received in a privacy mode, the controller displays the call request reception message and limits displaying of the identification information of the third party and the audio function.

The controller may block an audio path for the audio function while maintaining a communication with the mobile terminal in the privacy mode.

The hands-free service may include an audio function between the mobile terminal and the vehicle, a call request accepting function via the vehicle, a call request declining function via the vehicle, and a call ending function via the vehicle.

The controller may limit the audio function while maintaining the call request accepting function, the call request declining function, and the call ending function in the privacy mode.

The controller may switch an audio path for the audio function to the mobile terminal while maintaining a communication with the mobile terminal in the privacy mode.

The controller may restore the audio function when the call with the third party ends.

When the presence of the passenger is sensed and the call request is received from the third party in the privacy mode, the controller may deactivate the privacy mode in accordance with a selection of the driver.

When the privacy mode is deactivated, the controller may display the call request reception message and identification information of the third party and restores the audio function.

When the call with the third party ends, the controller may activate the privacy mode.

The passenger sensing unit may include at least one selected from the group consisting of a seat belt sensor installed at a seat and configured to sense whether the passenger wears a seat belt and a seating sensor installed at the seat and configured to sense whether the passenger is present.

In accordance with another aspect of the present disclosure, a method of controlling a vehicle includes establishing a communication with a mobile terminal of a driver, and displaying a call request reception message and identification information of a third party and providing an audio function of a hands-free service when a call request of the third party is received via the mobile terminal or displaying the call request reception message and limiting the identification information of the third party and the audio function when presence of passenger in the vehicle is sensed and the call request of the third party is received in a privacy mode.

The limiting of the audio function may include blocking an audio path for the audio function while maintaining the communication with the mobile terminal.

The limiting of the audio function may include switching the audio path for the audio function to the mobile terminal while maintaining the communication with the mobile terminal.

The hands-free service may include an audio function between the mobile terminal and the vehicle, a call request accepting function via the vehicle, a call request declining function via the vehicle, and a call ending function via the vehicle.

The limiting of the audio function may include limiting the audio function while maintaining the call request accepting function, the call request declining function, and the call ending function.

The method may further include restoring the audio function when a call with the third party ends.

The method may further include deactivating the privacy mode in accordance with a selection of the driver when the presence of the passenger is sensed and a call request of a third party is received in the privacy mode.

The method may further include displaying the call request reception message and identification information of the third party and restoring the audio function when the privacy mode is deactivated.

The method may further include activating the privacy mode when a call with the third party ends.

In accordance with another aspect of the present disclosure, a multimedia apparatus installed in a vehicle includes a touchscreen configured to receive a touch input of a driver and display image information corresponding to the touch input, a communication unit configured to communicate with a mobile terminal of the driver and receive information regarding whether a passenger is present in the vehicle from electronic devices included in the vehicle, and a controller configured to display a call request reception message and identification information of a third party when a call request is received from the third party via the mobile terminal and to provide an audio function of a hands-free service. When presence of the passenger is sensed and the call request of the third party is received in a privacy mode, the controller displays the call request reception message and limits displaying of the identification information of the third party and the audio function.

The controller may block an audio path for the audio function while maintaining a communication with the mobile terminal in the privacy mode.

The controller may switch an audio path for the audio function to the mobile terminal while maintaining a communication with the mobile terminal in the privacy mode.

The controller may restore the audio function when the call with the third party ends.

According to the present disclosure, a vehicle capable of protecting privacy of the driver by limiting an audio function of a hands-free service in a privacy mode, a method of controlling the same, and a multimedia apparatus may be provided.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
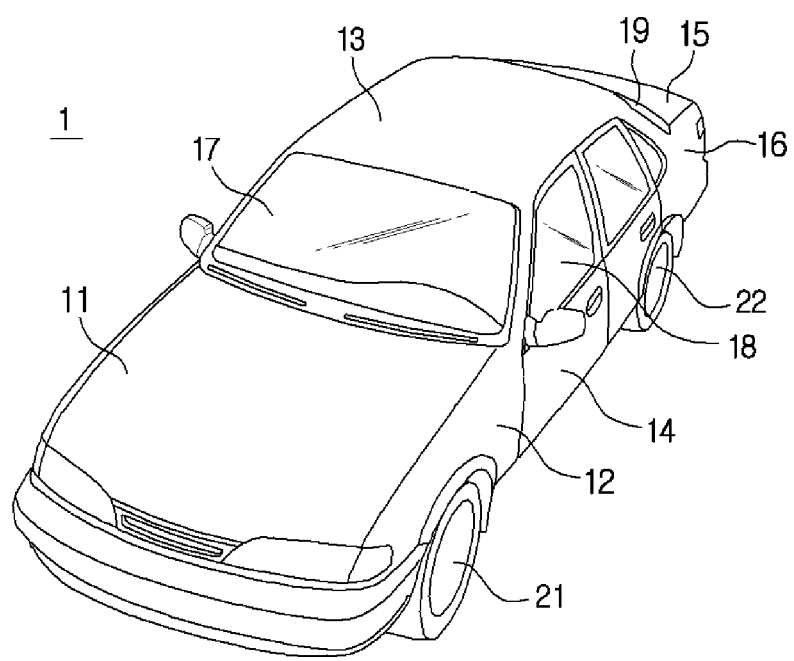
FIG. 1 is an exterior view of a vehicle according to an exemplary embodiment.

Reference will now be made in detail to the embodiments of the present disclosure, examples of which are illustrated in the accompanying drawings, wherein like reference numerals refer to like elements throughout.

Figure 2:
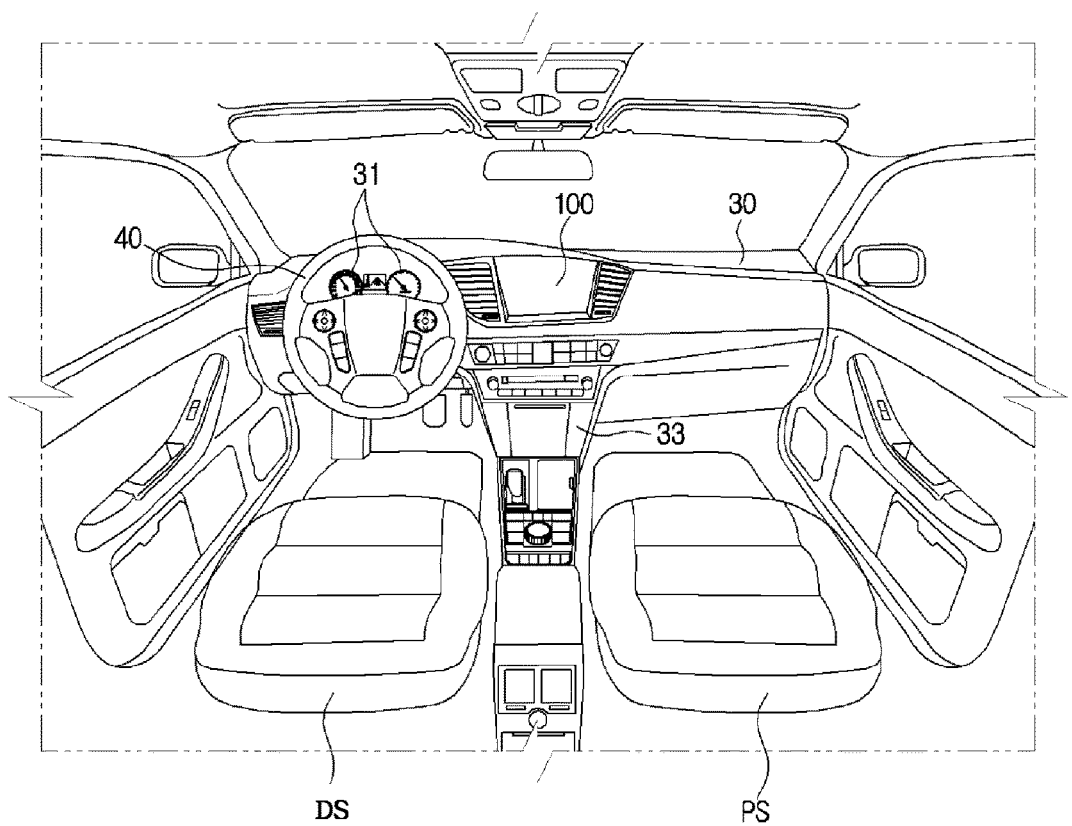
FIG. 2 is an interior view of a vehicle according to an exemplary embodiment.

FIG. 1 is an exterior view of a vehicle according to an exemplary embodiment. FIG. 2 is an interior view of the vehicle.

Referring to FIGS. 1 and 2, the vehicle 1 according to an exemplary embodiment includes a body defining an appearance of the vehicle 1, a frame (not shown) for implementing functions of the vehicle 1, and wheels 21 and 22 moving the body and the frame.

The wheels 21 and 22 include front wheels 21 disposed in front positions of the vehicle 1 and rear wheels 22 disposed in rear positions of the vehicle 1, and the body 10 and the frame may move forward or backward by rotation of the wheels.

The body may include a hood 11, front fenders 12, a roof panel 13, doors 14, a trunk lid 15, quarter panels 16, the wheels 21 and 22, and the like.

The exterior of the body may be provided with a front window 17 installed in a front position of the body 10, side windows 18 installed in the doors 14, and a rear window 19 installed in a rear position of the body 10.

The interior of the body may be provided with seats DS and PS on which a driver or a passenger sits, a dashboard 30 on which various devices to control operation of the vehicle 1 and to display driving information of the vehicle 1 are mounted, and a steering wheel 40 to manipulate a driving direction of the vehicle 1.

The seats DS and PS allow a driver to manipulate the vehicle 1 sitting comfortably and stably and may include a driver's seat DS, a front passenger's seat PS, and back seats (not shown).

The dashboard 30 may be provided with an instrument cluster 31 displaying driving-related information in which a speedometer, a fuel gauge, an automatic transmission selection indicator light, a tacometer, a trip meter, and the like, are installed, a center fascia 33 in which an audio control panel and an air conditioner control panel are installed, and a multimedia apparatus 100 outputting a music, image, and the like.

The center fascia 33 is a control panel located at a central position of the dashboard 30 between the driver's seat DS and the front passenger's seat PS. An audio apparatus, a manipulation unit to control an air conditioner and a heater, vents of the air conditioner for adjusting temperature in the body, a cigar jack, and the like, may be installed in the center fascia 33.

The multimedia apparatus 100 is an apparatus to output a music or an image in accordance with a driver's control command. Particularly, the multimedia apparatus 100 may reproduce a music or video or guide a route to a destination in accordance with a driver's control command.

A configuration and operation of the multimedia apparatus 100 will be described in more detail later.

The steering wheel 40 is attached to the dashboard 30 rotatably with respect to a steering shaft, and the driver may rotate the steering wheel 40 clockwise or counterclockwise to change a proceeding direction of the vehicle 1.

The frame (not shown) may be provided with a power generation apparatus to generate power for moving the vehicle 1 by burning a fuel, a fuel supply apparatus to supply a fuel to the power generation apparatus, a cooling apparatus to cool the heated power generation apparatus, an exhaust apparatus to discharge gas generated by the combustion of the fuel, a power transmission apparatus to transmit the power generated by the power generation apparatus to the wheels 20, a steering apparatus to transmit the proceeding direction of the vehicle 1 manipulated by the steering wheel 40 to the wheels 20, a brake apparatus to stop the rotation of the wheels 21 and 22, and a suspension apparatus to absorb vibrations of the wheels 21 and 22 caused by a road.

The exterior and interior configuration of the vehicle 1 according to an exemplary embodiment is described above.

Hereinafter, the configuration and operation of the multimedia apparatus 100 according to an exemplary embodiment will be described.

Figure 3:
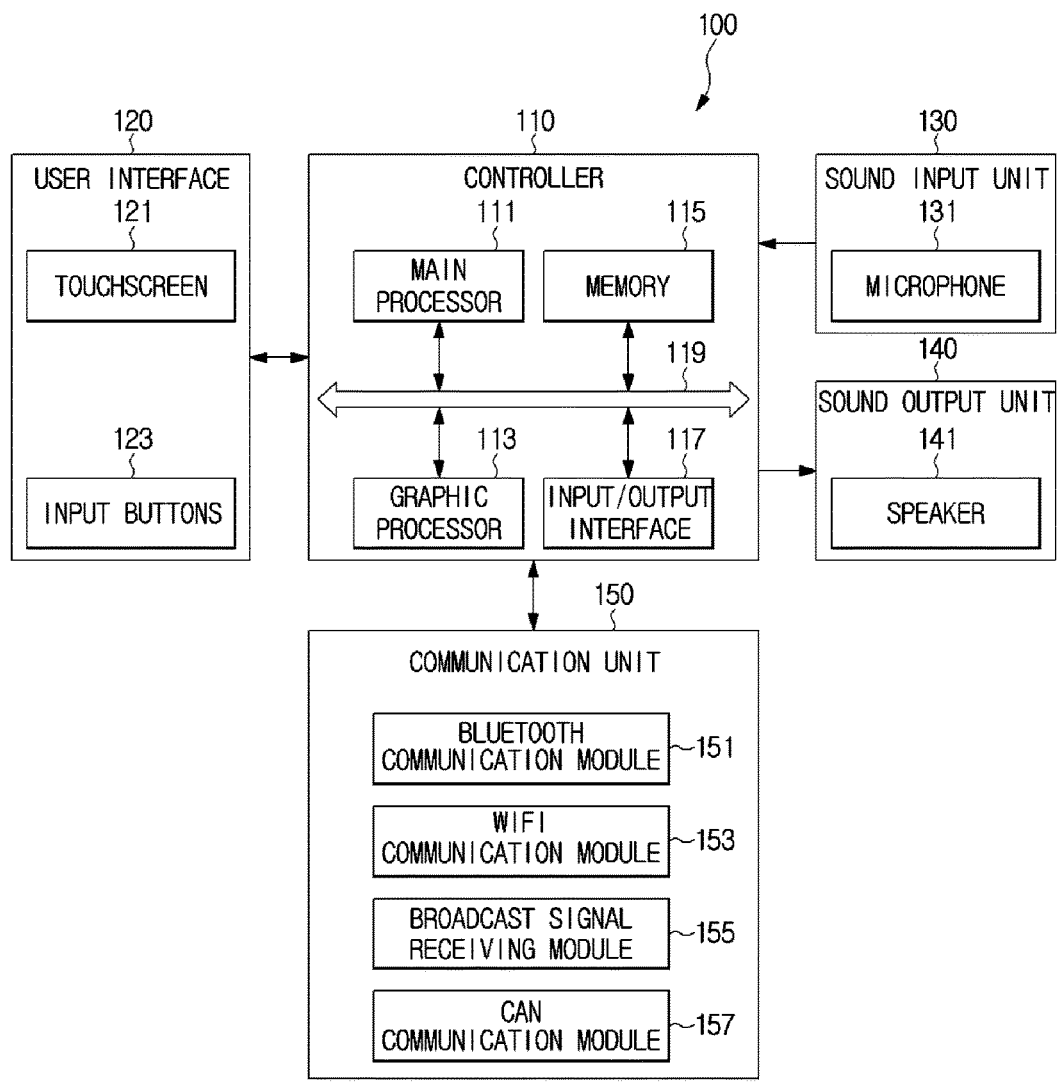
FIG. 3 is a block diagram illustrating a multimedia apparatus according to an exemplary embodiment.
Figure 4:
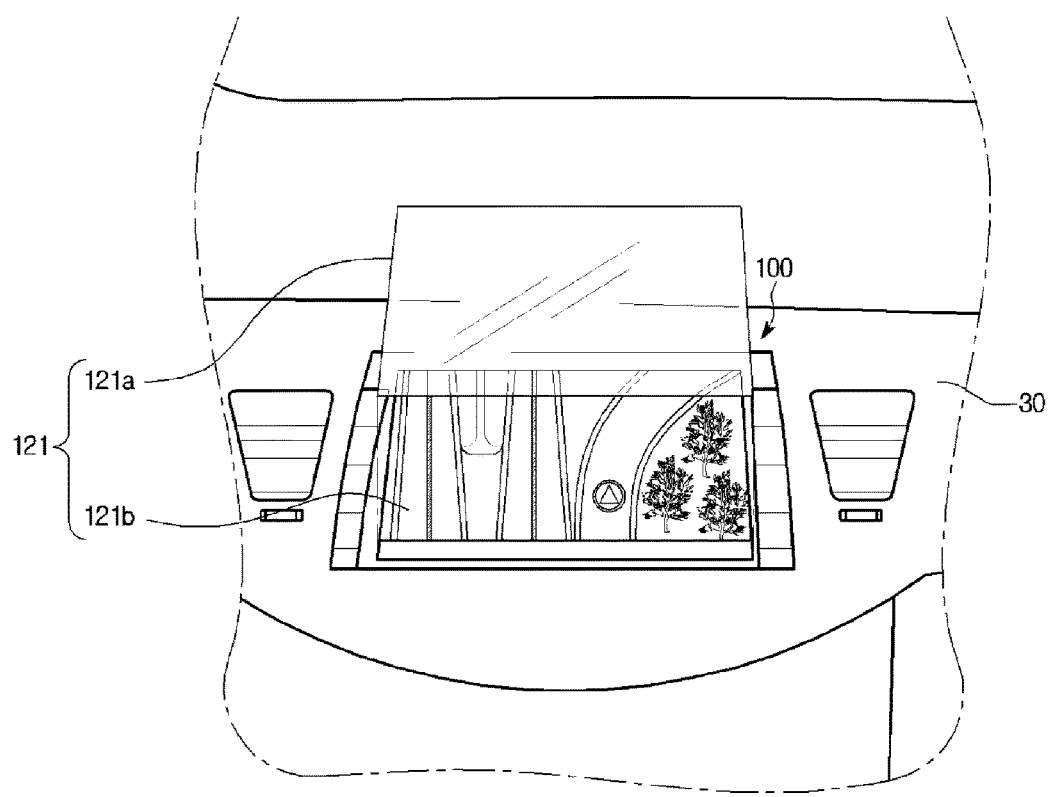
FIG. 4 is a diagram illustrating an appearance of a multimedia apparatus according to an exemplary embodiment.
Figure 5:
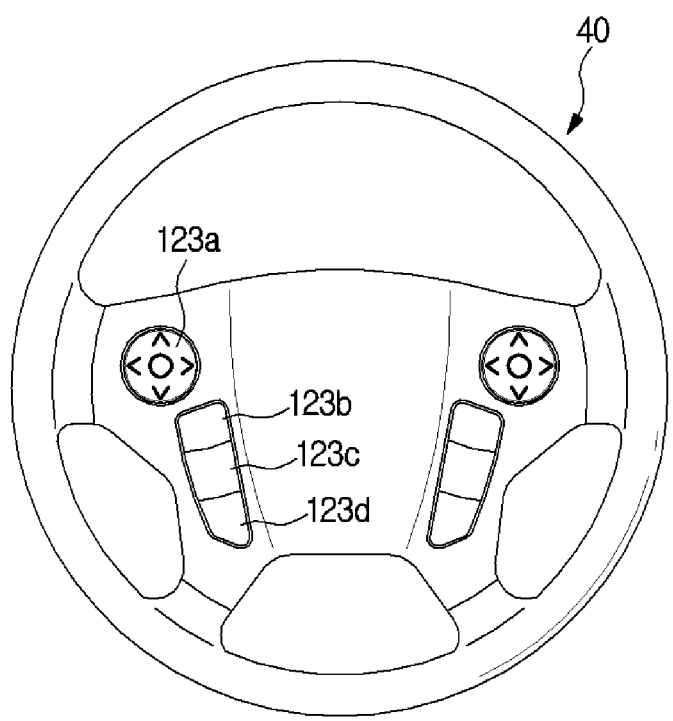
FIG. 5 is a diagram illustrating input buttons included in a multimedia apparatus according to an exemplary embodiment.

FIG. 3 is a block diagram illustrating a multimedia apparatus according to an exemplary embodiment. FIG. 4 is a diagram illustrating an appearance of the multimedia apparatus. FIG. 5 is a diagram illustrating input buttons included in the multimedia apparatus.

Referring to FIGS. 3 to 5, the multimedia apparatus 100 may include a user interface 120 to interact with a driver, a sound input unit 130 to receive sounds, a sound output unit 140 to output sounds, a communication unit 150 to communicate with an external device such as a mobile terminal (not shown), and a controller 110 to control the overall operation of the multimedia apparatus 100.

The user interface 120 may include a touchscreen 121 to receive a control command from the driver and display various image information in accordance with the control command of the driver and input buttons 123 through which the control command of the driver is input.

The touchscreen 121 may be disposed on the front surface of the multimedia apparatus 100 as illustrated in FIG. 4. The touchscreen 121 may receive the control command from the driver and visually display various information in response to the control command input by the driver.

The touchscreen 121 may include a touch panel 121a to detect a driver's touch and detect coordinates of a touch point (touch coordinates) of the driver, a display 121b to display image information, and a touchscreen controller (not shown) to control operation of the touchscreen 121.

The display 121b displays an image in accordance with image data received from the controller 110, which will be described later. In other words, the display 121b outputs optical signals corresponding to electrical signals received from the controller 110. For example, the display 121b may display a map for guiding a route in accordance with image data received from the controller 110 or a menu corresponding to the control command selectable by the driver.

The display 121b may be a light emitting diode (LED) panel, an organic light emitting diode (OLED) panel, or a liquid crystal display (LCD) panel.

The touch panel 121a may be disposed on the front surface of the display 121b and may be formed of a transparent material to transmit the optical signals output from the display 121b.

The touch panel 121a may detect the driver's touch and the touch coordinates of the driver by detecting a change in capacitance or pressure caused by the driver's touch.

For example, a capacitive-type touch panel includes a dielectric material (insulator) between the two electrically separated electrodes and may sense a change in capacitance between the two electrodes caused by a touch of a part of the driver's body. In this case, the touch panel may detect the driver's touch and the touch coordinates by using the sensed change in capacitance.

In addition, a resistive-type (pressure sensing) touch panel may include a dielectric material (insulator) between two electrically separated electrodes. Due to a touch of a part of the driver's body, the two electrodes contact, and thus electrical resistance between the two electrodes is changed. In this case, the touch panel senses a change in electrical resistance between the two electrodes, thereby detecting the driver's touch and the touch coordinates.

The touchscreen controller may control the touch panel 121a to detect the driver's touch and the touch coordinates and transmit the touch coordinates detected by the touch panel 121a to the controller 110.

The touchscreen controller may also control the display 121b to receive image data from the controller 110 and display an image corresponding to the received image data.

As described above, the touchscreen 121 may detect the driver's touch and the touch coordinates and transmit the detected touch coordinates to the controller 110. In addition, the controller 110 may judge the control command of the driver in accordance with the touch coordinates received from the touchscreen 121 and transmit image data corresponding to the control command of the driver to the touchscreen 121. The touchscreen 121 may display an image corresponding to the image data received from the controller 110.

The input buttons 123 may be separately disposed on the steering wheel 40 of the vehicle 1 as illustrated in FIG. 5.

In addition, the input buttons 123 may include a 4-way jog button 123a to control a volume of sound output by the multimedia apparatus 100, a mode button 123b to change a mode of the multimedia apparatus 100, a voice recognition button 123c to activate a voice recognition function of the multimedia apparatus 100, and a call button 123d to receive a call via the multimedia apparatus 100.

Since the input buttons 123 for inputting the control command into the multimedia apparatus 100 are disposed on the steering wheel 40, the driver may input the control command into the multimedia apparatus 100 through the input buttons 123 in a state of holding the steering wheel 40.

The input buttons 123 may employ a push switch, a toggle switch, a sliding switch, a membrane switch, a touch switch, or a dial.

The sound input unit 130 includes a microphone 131 to receive sound signals from the outside of the multimedia apparatus 100 and to convert the received sound signals into electric signals. The sound input unit 130 may further include an amplifier to amplify the electric signals converted by the microphone 131 and an analog-to-digital convertor (ADC) to digitize the electric signals converted by the microphone 131.

The sound output unit 140 includes a speaker 141 to convert the electric signals into sound signals and output the converted sound signals to the outside of the multimedia apparatus 100. The sound output unit 140 may further include a digital-to-analog convertor (DAC) to convert the digitized electric signals into analog signals and an amplifier to amplify the analog signals.

The communication unit 150 may receive/transmit data from/to an external device via a variety of communication methods.

Particularly, the communication unit 150 may include a Bluetooth communication module 151 that performs one-to-one communications with a single external device or one-to-multi communications with a few external devices, a wireless fidelity (WiFi) communication module 153 that accesses a local area network (LAN) via a wireless access point (AP), or the like, a broadcast signal receiving module 155 that receives digital broadcast signals, and a control area network (CAN) communication module 157 that communicates with various electronic devices included in the vehicle 1.

For example, the communication unit 150 may communicate with a mobile terminal (not shown) of the driver via the Bluetooth communication module 151. In this regard, the Bluetooth communication refers to a method of communicating with an external device by using the 2.45 GHz frequency band divided into 80 channels by a frequency hopping method.

In addition, the Bluetooth communication module 151 may include a plurality of profiles to perform various functions via communications between the driver and the mobile terminal. Here, the profiles refers to Bluetooth protocols required for applications using Bluetooth communications and standards defining methods of using the Bluetooth protocols.

Particularly, the Bluetooth communication module 151 of the vehicle 1 may include a generic access profile (GAP) to establish a Bluetooth communication, an advanced audio distribution profile (A2DP) to support high-quality stereo audio streaming, an audio/video remote control profile (AVRCP) to support a basic remote control command such as play/stop commands, stereo audio streaming, and video streaming, a hands-free profile to communicate with a mobile terminal to transmit/receive a voice and control a call, and a phone book access profile to access a phone-book of the mobile terminal and a phone call history.

In addition, the plurality of profiles included in the Bluetooth communication module 151 may independently operate in accordance with applications of the multimedia apparatus 100. In other words, when a Bluetooth communication is established between the multimedia apparatus 100 and the mobile terminal, a plurality of applications installed in the multimedia apparatus 100 may transmit/receive data to/from the mobile terminal via the plurality of profiles of the Bluetooth communication module 151.

The controller 110 controls the overall operation of the multimedia apparatus 100.

The controller 110 may include an input/output interface 117 to mediate input and output of data between various devices included in the multimedia apparatus 100 and the controller 110, a memory 115 to store a program and data, a graphic processor 113 to perform image processing, and a main processor 111 to perform calculation operation in accordance with the program and data stored in the memory 115. In addition, the controller 110 may further include a system bus 119 to provide a data transfer path among the main processor 111, the input/output interface 117, the memory 115, the graphic processor 113, and the main processor 111.

The input/output interface 117 may receive a control command from the user interface 120 or receive sound data from the sound input unit 130 and may transit the received control command or sound data to the main processor 111, the graphic processor 113, or the memory 115 via the system bus 119.

In addition, the input/output interface 117 may transfer various control signals and data output from the main processor 111 to the user interface 120 or the sound output unit 140.

The memory 115 may store a control program and control data to control operation of the multimedia apparatus 100 or store the control signals output from the main processor 111, image data output from the graphic processor 113, the control command received from the user interface 120, or the sound data received from the sound input unit 130.

The memory 115 may include a volatile memory such as a static random access memory (S-RAM) and a dynamic random access memory (D-RAM) and a non-volatile memory such as a flash memory, a read only memory (ROM), an erasable programmable read only memory (EPROM), and an electrically erasable programmable read only memory (EEPROM).

The non-volatile memory may operate as an auxiliary memory of the volatile memory, may store the control program and control data to control operation of the multimedia apparatus 100, may maintain the stored data even after the power of the multimedia apparatus 100 is off.

The volatile memory may store the control program and control data received from the non-volatile memory, the control signals output from the main processor 111, the image data output from the graphic processor 113, the control command received from the user interface 120, and the sound data received from the sound input unit 130.

Differently from the non-volatile memory, the volatile memory may lose the stored data when the power of the multimedia apparatus 100 is off.

The graphic processor 113 may convert image data output from the main processor 111 or image data stored in the memory 115 into a format that may be displayed via the touchscreen 121 of the user interface 120. For example, the graphic processor 113 may perform rendering operation to display 3D image data on a 2D touchscreen 121 for a route guidance.

The main processor 111 may perform calculation operation to control the user interface 120, the sound input unit 130, the sound output unit 140, and the communication unit 150 in accordance with the control program and control data stored in the memory 115.

For example, the main processor 111 may perform calculation operation to judge the control command based on the touch coordinates received from the touchscreen 121 of the user interface 120 or to judge the control command based on the sound data received via the sound input unit 130.

In addition, the main processor 111 may perform calculation operation to output sounds via the sound output unit 140 or to display an image via the touchscreen 121 of the user interface 120 in accordance with the recognized control command.

As described above, the controller 110 may control and manage the constituent elements of the multimedia apparatus 100, and it may be interpreted that an operation of the multimedia apparatus 100, which will be described later, is operation controlled by a control operation of the controller 110.

The configuration of the multimedia apparatus 100 is described above.

However, the electronic devices included in the vehicle 1 are not limited to the multimedia apparatus 100, and the vehicle 1 may include various other electronic devices.

Figure 6:
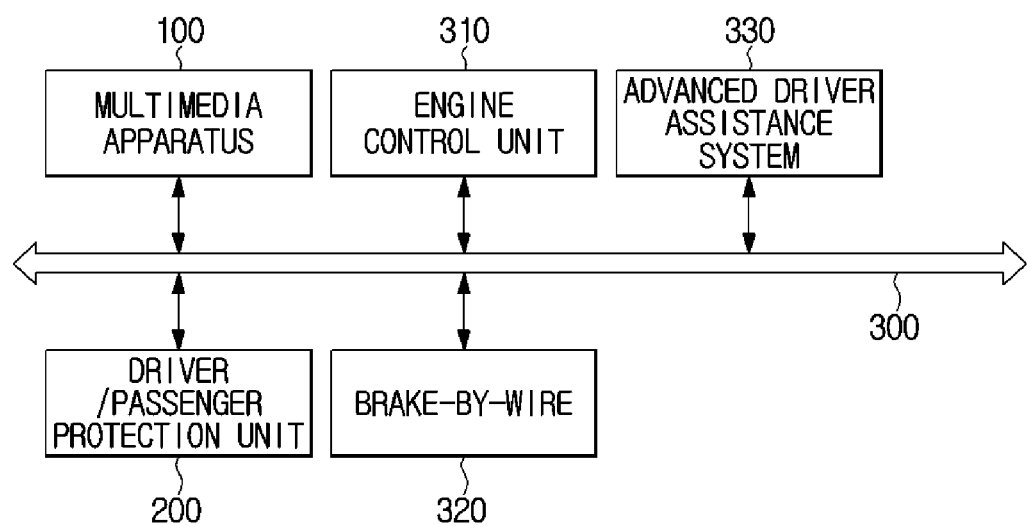
FIG. 6 is a block diagram illustrating various electronic devices included in a vehicle according to an exemplary embodiment.
Figure 7:
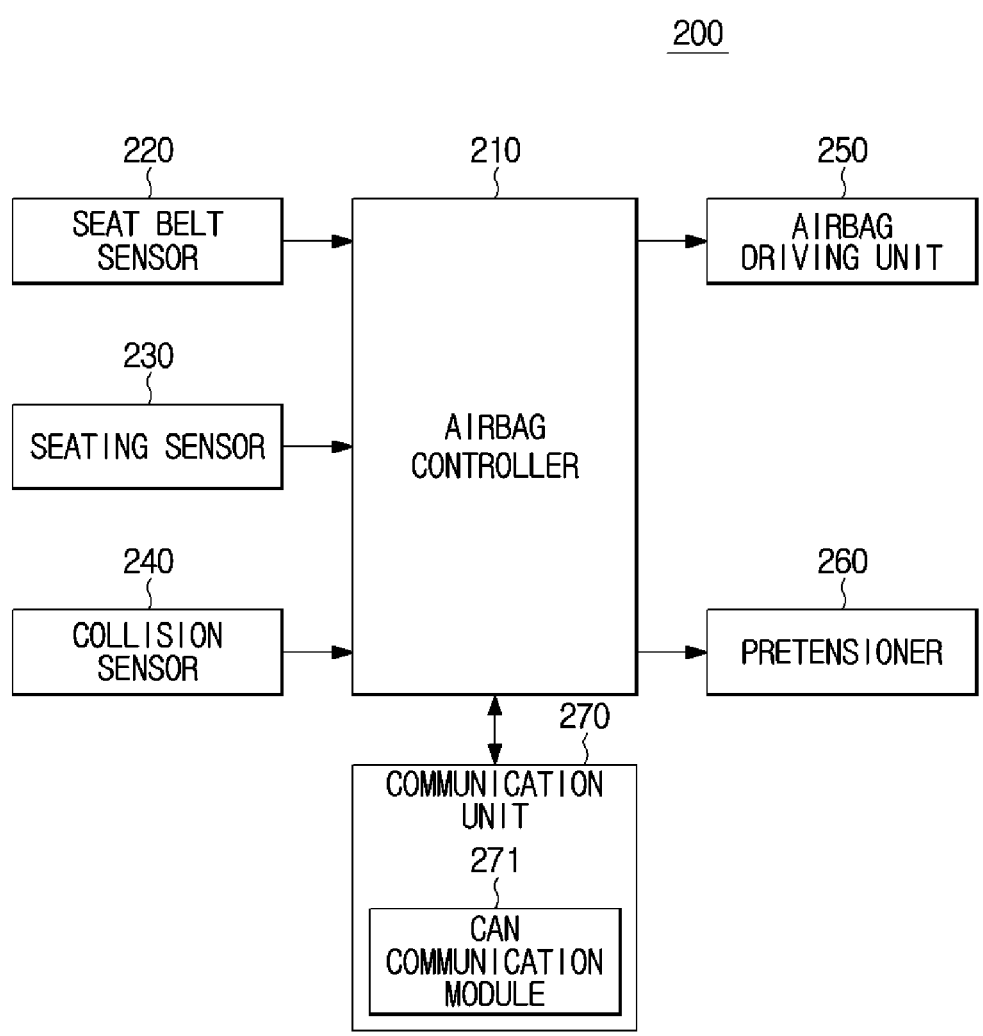
FIG. 7 is a block diagram illustrating an airbag apparatus included in a vehicle according to an exemplary embodiment.

FIG. 6 is a block diagram illustrating various electronic devices included in a vehicle according to an exemplary embodiment. FIG. 7 is a block diagram illustrating an airbag apparatus included in the vehicle.

Referring to FIGS. 6 and 7, the vehicle 1 may include the multimedia apparatus 100 as described above, a driver/passenger protection unit 200 to protect people in the vehicle 1, an engine control unit (ECU) 310 to adjust a fuel supply to an engine of the vehicle 1 and control driving of the engine, a brake-by-wire 320 to control braking of the vehicle 1, and an advanced driver assistance system 330 to assist driving of the driver by using functions of forward collision avoidance, lane departure warning, dead zone monitoring, rear monitoring, and the like.

The electronic devices of the vehicle 1 illustrated in FIG. 6 are examples of electronic devices that may be installed in the vehicle 1, and various other electronic devices not illustrated in FIG. 6 may also be installed in the vehicle 1.

Among the various electronic devices illustrated in FIG. 6, the driver/passenger protection unit 200 will be briefly described.

As illustrated in FIG. 7, the driver/passenger protection unit 200 may include a seat belt sensor 220, a seating sensor 230, a collision sensor 240, an airbag driving unit 250, a pretensioner 260, a communication unit 270, and an airbag controller 210.

The seat belt sensor 220 is disposed at each seat belt of the seats DS and PS and senses whether the driver or the passenger wears the seat belt. The seat belt sensor 220 may include a micro switch installed at the seat belt and outputting an electric signal in accordance with the wearing of the seat belt.

The seating sensor 230 is installed at each of the seats DS and PS to sense whether the seats DS and PS are occupied by the driver or the passenger. The seating sensor 230 may include a load cell to output an electric signal in accordance with a pressure applied to each of the seats DS and PS.

The collision sensor 240 senses an impact caused by a collision between the vehicle 1 and a foreign object. The collision sensor 240 may include an acceleration sensor to output an electric signal corresponding to a change in acceleration caused by the collision between the vehicle 1 and the foreign object.

The airbag 250 is installed at the steering wheel 40 and the dashboard 30 and expands in accordance with a control signal of the airbag controller 210.

Particularly, the airbag 250 that is a bag expanding as it is filled with nitrogen gas generated by an ignition circuit may protect the driver and the passenger from an impact caused by a collision of the vehicle 1. In addition, in order to prevent the driver and the passenger from being pressed by the airbag 250, the airbag 250 discharges nitrogen gas via a discharge hole within a shorter period of time after expansion.

The pretensioner 260 is installed at the seat belt and tightens the seat belt in accordance with a control signal of the airbag controller 210. In other words, the pretensioner 260 pulls the seat belt when the vehicle 1 collides with the foreign object to firmly fix the driver and the passenger to the seats DS and PS.

As described above, the pretensioner 260 may protect the driver and the passenger from a secondary impact that may be caused after the collision of the vehicle 1 by firmly fixing the driver and the passenger to the seats DS and PS.

The airbag communication unit 270 may include a control area network (CAN) communication module 271 communicating with various electronic devices included in the vehicle 1.

The airbag controller 210 controls the airbag 250 and the pretensioner 260 based on the sensing results of the seat belt sensor 220, the seating sensor 230, and the collision sensor 240.

Particularly, the airbag controller 210 may judge a collision of the vehicle 1 based on an output of the collision sensor 240. Upon determination that a collision occurs, the airbag controller 210 operates the airbag 250 and the pretensioner 260.

In addition, the airbag controller 210 may determine whether the driver or the passenger wears the seat belt based on outputs of the seat belt sensor 220 and the seating sensor 230 and determine the degree of expansion of the airbag 250 in accordance with the wearing of the seat belt.

The airbag controller 210 may also estimate a build of the driver or the passenger based on an output of the seating sensor 230 and determine the degree of expansion of the airbag 250 and the degree of tightening of the seat belt according to the estimated build of the driver or the passenger.

In addition, the airbag controller 210 may transmit sensing results of the seat belt sensor 220, the seating sensor 230, and the collision sensor 240 to various electronic devices included in the vehicle 1 via the communication unit 270.

For example, the airbag controller 210 may transmit sensing results of the seat belt sensor 220, the seating sensor 230, and the collision sensor 240 to the multimedia apparatus 100 via the communication unit 270.

Furthermore, the controller 110 of the multimedia apparatus 100 may control the touchscreen 121 and the sound output unit 140 in accordance with the sensing results of the seat belt sensor 220, the seating sensor 230, and the collision sensor 240.

As described above, the various electronic devices included in the vehicle 1 may transmit/receive data to/from each other via a communication line 300. In other words, the various electronic devices included in the vehicle 1 may communicate with each other via a CAN communication and constitute a CAN network.

The CAN communication is a communication protocol developed for communications between parts constituting a vehicle and characterized by a communication method in a differential mode by using twisted pair wires.

In addition, the electronic devices constituting the CAN communication network are not distinguished as a master device and a slave device, and one electronic device may transmit data via the communication line 300 without limitation so long as the communication line 300 is not occupied by another electronic device.

As described above, the multimedia apparatus 100 and the driver/passenger protection unit 200 include CAN communication modules 157 and 271 and the multimedia apparatus 100 and the driver/passenger protection unit 200 may perform data transmission and reception via the CAN communication modules 157 and 271.

The configurations of the vehicle 1 and the multimedia apparatus 100 are described above.

Hereinafter, operation of the vehicle 1 and the multimedia apparatus 100 will be described.

Figure 8:
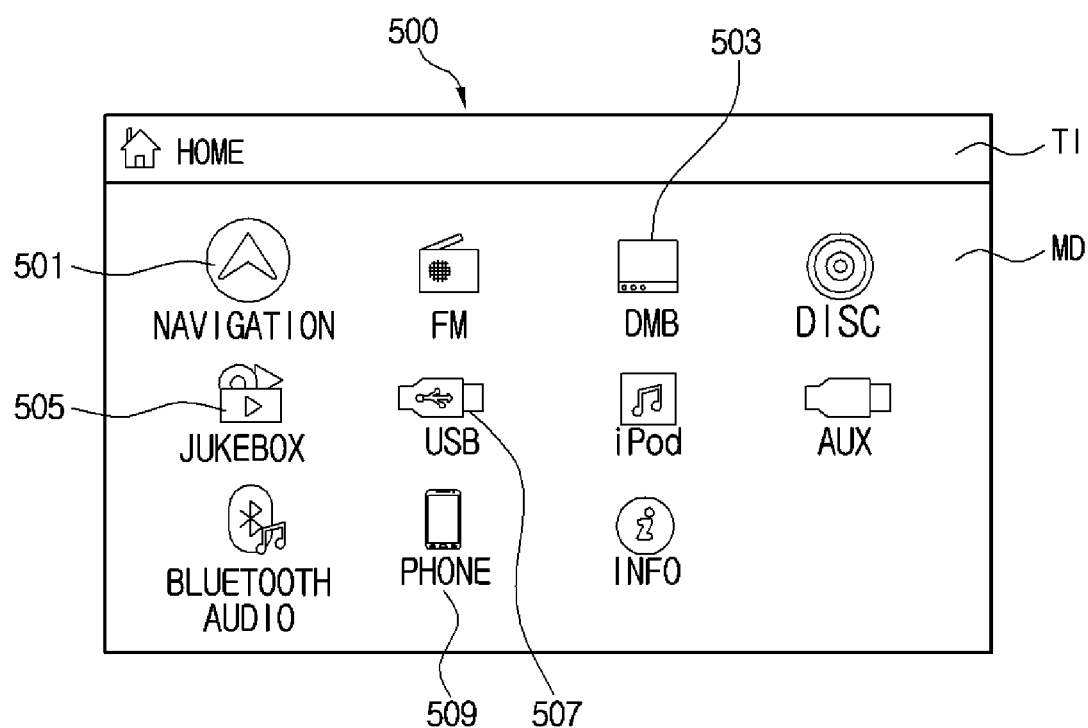
FIG. 8 is a diagram illustrating an example of a home screen of a multimedia apparatus according to an exemplary embodiment.
Figure 9:
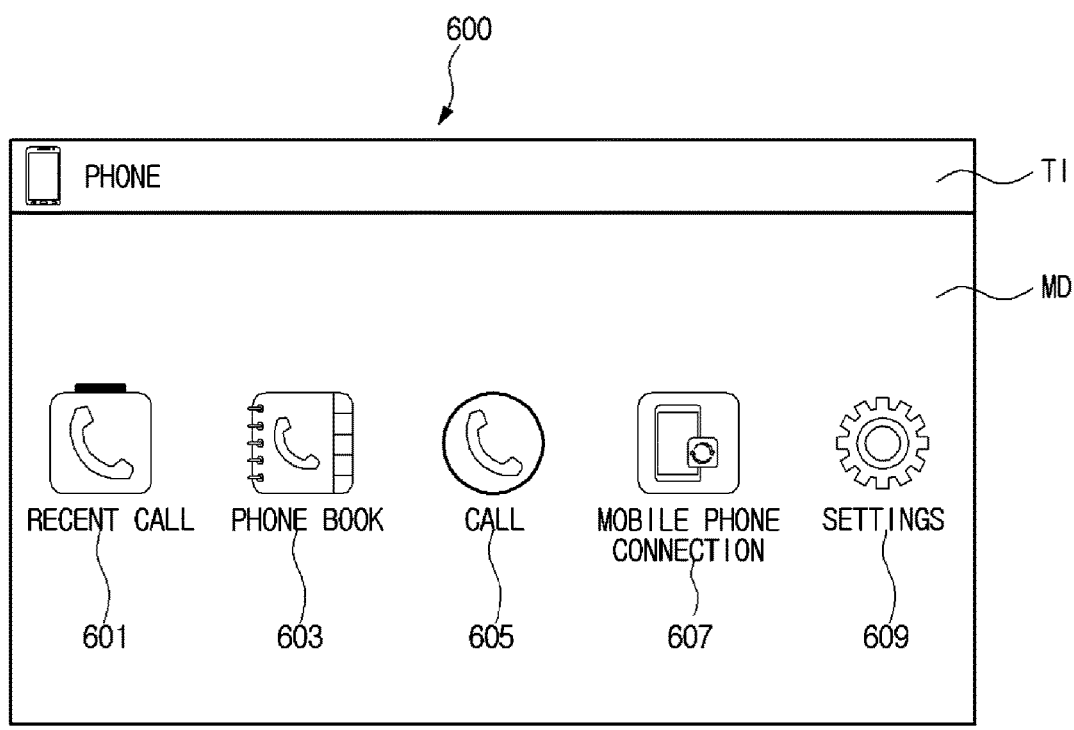
FIG. 9 is a diagram illustrating an example of a hands-free service screen displayed by a multimedia apparatus according to an exemplary embodiment.
Figure 10:
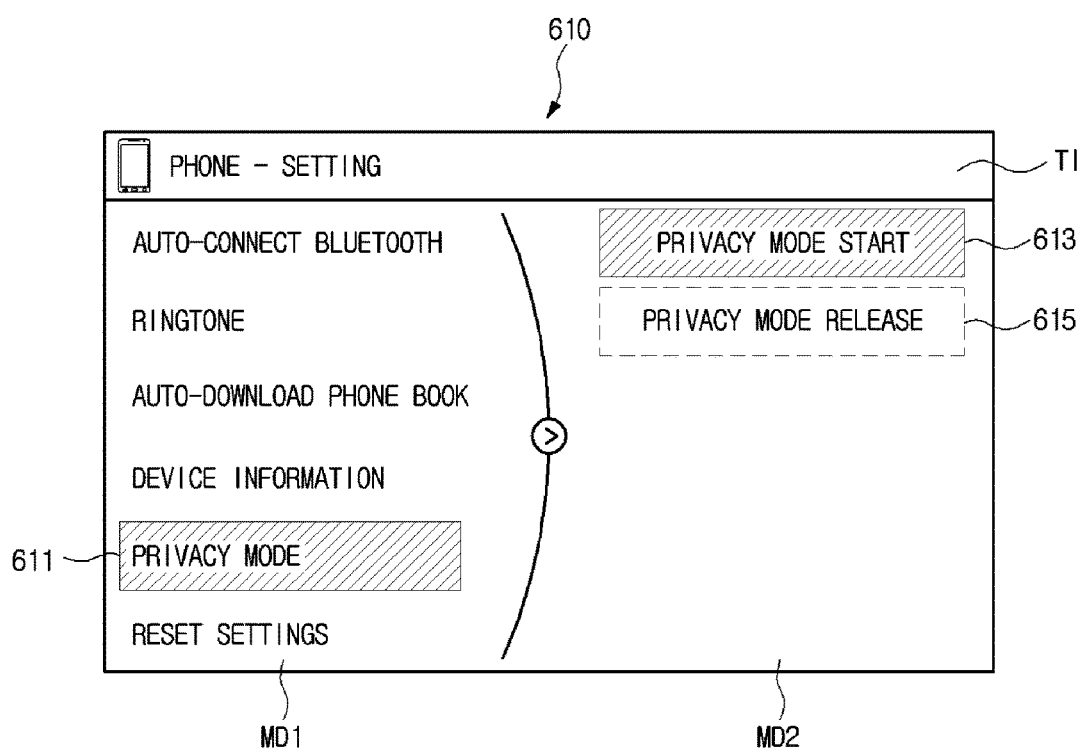
FIG. 10 is a diagram illustrating an example of a screen for setting a call connection function of a multimedia apparatus according to an exemplary embodiment.

FIG. 8 illustrates an example of a home screen of a multimedia apparatus according to an exemplary embodiment. FIG. 9 illustrates an example of a hands-free service screen displayed by the multimedia apparatus. FIG. 10 illustrates an example of a screen for setting a call connection function of the multimedia apparatus.

As illustrated in FIGS. 8 to 10, the touchscreen 121 may provide various screens and images to the driver in accordance with operation of the multimedia apparatus 100.

For example, the multimedia apparatus 100 may display a home screen 500 enabling the driver to select various functions and a hands-free service screen 600 providing a hands-free function by communicating with a mobile terminal of the driver.

In addition, a screen displayed on the touchscreen 121 may be divided into a title region TI indicating a title of the screen and a main display region MD displaying various information corresponding to a control command of the driver and control commands selectable by the driver.

When the driver turns on the multimedia apparatus 100, the multimedia apparatus 100 may display the home screen 500 as illustrated in FIG. 8.

The home screen 500 includes the title region TI and the main display region MD. In the title region TI of the home screen 500, a title "HOME" may be displayed to indicate a screen displayed on the touchscreen 121 is the home screen 500.

In addition, in the main display region MD of the home screen 500, a plurality of icons 501 to 509 indicating various functions performed by the multimedia apparatus 100 may be displayed. For example, a navigation icon 501 to perform a navigation function to display a route to a destination selected by the driver, a digital multimedia broadcasting (DMB) icon 503 to receive digital broadcasting and display digital broadcast contents, a jukebox 505 to play music, a universal serial bus (USB) icon 507 to search for a file stored in an external storage medium, such as, a USB memory, and a phone icon 509 to provide a hands-free service to the driver may be displayed in the main display region MD.

The driver may select a service to use and touch one of the icons 501 to 509 corresponding to the selected service. When the driver touches the touchscreen 121, the touchscreen 121 detects coordinates of a touch point (touch coordinates) of the driver and transmits the detected touch coordinates to the controller 110.

When the touch coordinates are received from the touchscreen 121, the controller 110 compares the touch coordinates of the driver with the positions of the icons of the home screen 500, thereby determining a control command input by the driver. In addition, the controller 110 transmits image data corresponding to the control command of the driver to the touchscreen 121.

Upon receiving the image data from the controller 110, the touchscreen 121 displays an image corresponding to the received image data.

For example, when the driver touches the phone icon 509, the touchscreen 121 detects the touch coordinate of the driver and transmits the detected touch coordinates to the controller 110. The controller 110 recognizes a hands-free service command of the driver based on the touch coordinates of the driver and controls the touchscreen 121 to display the hands-free service screen 600 as illustrated in FIG. 9.

In this regard, the hands-free service refers to a service allowing the driver to make calls by using the multimedia apparatus 100 instead of the mobile terminal.

In other words, the driver may make or receive phone calls via communications between the multimedia apparatus 100 and the mobile terminal.

The driver may input a voice into the multimedia apparatus 100 via the sound input unit 130, and the multimedia apparatus 100 may transmit audio signals of the input voice to the mobile terminal. Also, the mobile terminal may transmit audio signals of a counterpart's voice to the multimedia apparatus 100, and the multimedia apparatus 100 may output the audio signals via the sound output unit 140.

By using the hands-free service, the driver may have a telephone conversation by using the multimedia apparatus 100 without manipulating the mobile terminal.

For example, the multimedia apparatus 100 may communicate with the mobile terminal via the Bluetooth communication module 151. Particularly, the multimedia apparatus 100 may provide the hands-free service by using a hands-free profile (HFP) of the Bluetooth communication module 151. Particularly, the HFP may provide functions such as an audio connection controlling function for the hands-free service, a call request accepting function, a call request declining function, a call ending function, an audio path switching function during a call, and a redialing function.

The multimedia apparatus 100 may display information related to the hands-free service via the hands-free service screen 600 and may receive a control command related to the hands-free service from the driver.

In the title region TI of the hands-free service screen 600, a title "PHONE" indicating the hands-free service of the multimedia apparatus 100 may be displayed.

In addition, in the main display region MD of the hands-free service screen 600, a plurality of icons 601 to 609 for providing the hands-free service may be displayed. For example, a recent call icon 601 to display a recent call list of the driver, a phone book icon 603 to display phone numbers stored in the mobile terminal of the driver, a call icon 605 to provide a phone call service through the mobile terminal of the driver, a mobile phone connection icon 607 to establish a communication with the mobile terminal of the driver, and a settings icon 609 to change settings related to the phone call service of the multimedia apparatus 100 may be displayed in the main display region MD.

The driver may select one of the icons 601 to 609 displayed on the hands-free service screen 600 by touching a corresponding icon selected from icons 601 to 609.

For example, the driver may touch the mobile phone connection icon 607 to connect the mobile terminal with the multimedia apparatus 100.

When the driver touches the mobile phone connection icon 607, the touchscreen 121 detects the touch coordinates of the driver and transmits the detected touch coordinates to the controller 110. In addition, the controller 110 may recognize a command of the driver to connect the multimedia apparatus 100 with the mobile terminal of the driver based on the touch coordinates of the driver and attempt to connect a communication with the mobile terminal of the driver.

The attempt of connecting communications with the mobile terminal of the driver will be described in more detail later.

For example, the driver may also touch the settings icon 609 to change settings related to the hands-free function.

When the driver touches the settings icon 609, the touchscreen 121 detects the touch coordinates of the driver and transmits the detected touch coordinates to the controller 110. The controller 110 may recognize a command of the driver to change settings related to the hands-free service based on the touch coordinates of the driver and control the touchscreen 121 to display a hands-free settings screen 610 as illustrated in FIG. 10.

In the title region TI of the hands-free settings screen 610, a title "PHONE-SETTING" may be displayed to indicate hands-free settings of the multimedia apparatus 100.

In addition, the main display region MD of the hands-free settings screen 610 may be divided into a first main display region MD1 and a second main display region MD2.

A plurality of menus for hand-free settings may be displayed in the first main display region MD1, and sub-menus of the menus displayed in the first main display region MD1 may be displayed in the second main display region MD2.

The driver may set a privacy mode to protect privacy of the driver via the hands-free settings screen 610. In the privacy mode, the multimedia apparatus 100 may limit the hands-free function to protect privacy of the driver. That is, in the privacy mode, the driver may make a call by using the mobile terminal instead of the multimedia apparatus 100.

When the driver touches a privacy mode menu 611 displayed in the first main display region MD1 of the hands-free settings screen 610, a privacy mode-start tab 613 and a privacy mode-release tab 615 are displayed in the second main display region MD2.

When the driver touches the privacy mode-start tab 613, the multimedia apparatus 100 activates the privacy mode and stores the privacy mode activation in the memory 115. Also, when the driver touches the privacy mode-release tab 615, the multimedia apparatus 100 deactivates the privacy mode and stores the privacy mode deactivation in the memory 115.

As described above, the multimedia apparatus 100 may provide the hands-free service to the driver and provide the privacy mode to protect privacy of the driver during the hands-free service.

Hereinafter, communications between the multimedia apparatus 100 and the mobile terminal to provide the hands-free service and operation of the multimedia apparatus 100 in the privacy mode will be described.

Figure 11:
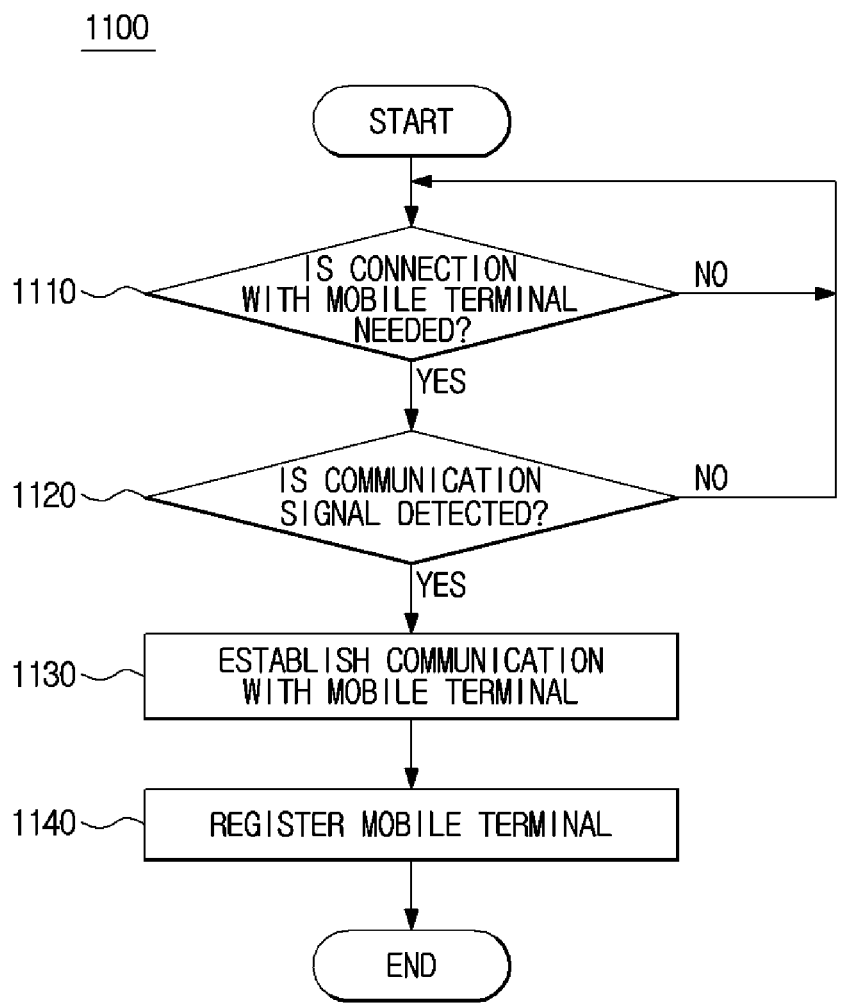
FIG. 11 is a flowchart illustrating an example of operation of a multimedia apparatus according to an exemplary embodiment for establishing a communication with a mobile terminal.
Figure 12:
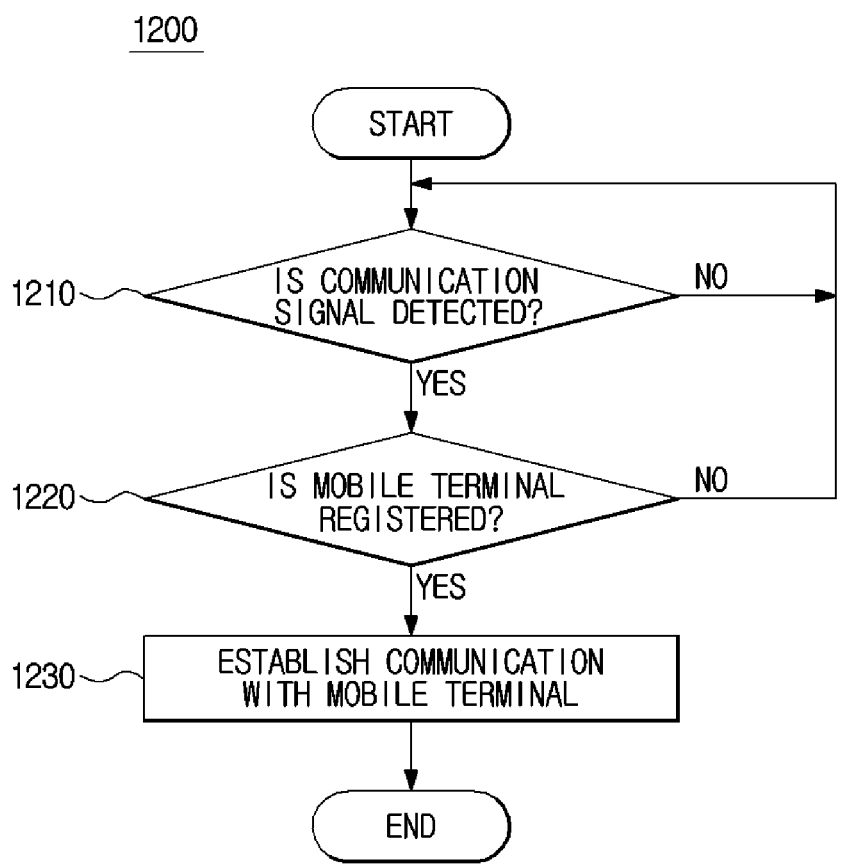
FIG. 12 is a flowchart illustrating another example of operation of a multimedia apparatus according to an exemplary embodiment for establishing a communication with a mobile terminal.

FIG. 11 is a flowchart illustrating an example of operation of a multimedia apparatus according to an exemplary embodiment for establishing a communication with a mobile terminal. FIG. 12 is a flowchart illustrating another example of operation of the multimedia apparatus for establishing a communication with the mobile terminal.

Referring to FIG. 11, an operation of the multimedia apparatus 100 for establishing a communication with the mobile terminal will be described (1100).

The multimedia apparatus 100 determines whether to connect a communication with the mobile terminal (1110).

As described above, when the driver touches the mobile phone connection icon 607 displayed on the hands-free service screen 600, the multimedia apparatus 100 may determine to connect a communication with the mobile terminal.

Upon determination to connect a communication with the mobile terminal (Yes of 1110), the multimedia apparatus 100 determines whether a communication signal of the mobile terminal is detected (1120).

The multimedia apparatus 100 may transmit a search signal by using the communication unit 150 and search for a response signal from the mobile terminal.

Particularly, the multimedia apparatus 100 transmits a search signal having a predetermined frequency by using the communication unit 150 and waits for a response signal from the mobile terminal. When the response signal is received from the mobile terminal, the multimedia apparatus 100 may determine whether a received wireless signal is a signal which complies with a predetermined communication protocol, whether the received wireless signal is a response signal from the mobile terminal, and the like.

If the received wireless signal is a signal complying with a predetermined communication protocol and a response signal from the mobile terminal, the multimedia apparatus 100 may determine that a communication single of the mobile terminal is detected.

For example, the multimedia apparatus 100 may detect a Bluetooth communication signal of the mobile terminal via a generic access profile (GAP) of the Bluetooth communication module 151.

When the communication signal of the mobile terminal is detected (Yes of 1120), the multimedia apparatus 100 establishes a communication with the mobile terminal (1130).

To establish a communication between a user and a communication device, the multimedia apparatus 100 transmits a connection request signal to the mobile terminal and receives a connection accept signal from the mobile terminal. In addition, the multimedia apparatus 100 may transmit identification information of the multimedia apparatus 100 to the mobile terminal and receive identification of the mobile terminal from the mobile terminal.

Upon receiving the connection accept signal and identification information from the mobile terminal, the multimedia apparatus 100 attempts a user authentication. For the user authentication, the multimedia apparatus 100 may transmit a pin code to the mobile terminal and receive a pin code input by the driver. When the pin code received from the driver is identical to the pin code transmitted to the mobile terminal, a communication between the multimedia apparatus 100 and the mobile terminal is established.

For example, the multimedia apparatus 100 may establish a communication with the mobile terminal via the GAP of the Bluetooth communication module 151.

Then, the multimedia apparatus 100 registers the mobile terminal (1140). In order to register the mobile terminal, the multimedia apparatus 100 may store identification information of the mobile terminal in the memory 115 of the controller 110.

As described above, when the driver inputs a mobile phone connection command, the multimedia apparatus 100 may search for a wireless signal of the mobile terminal, establish a communication with the mobile terminal based on the searched wireless signal, and register the mobile terminal.

After the mobile terminal is registered, the multimedia apparatus 100 may automatically establish a communication with the registered mobile terminal.

Referring to FIG. 12, an operation of the multimedia apparatus 100 for automatically establishing a communication with the mobile terminal will be described (1200).

The multimedia apparatus 100 determines whether a communication signal of the mobile terminal is detected (1210).

The multimedia apparatus 100 searches for a wireless signal having a predetermined frequency by using the communication unit 150. When the wireless signal is detected, the multimedia apparatus 100 determines whether the detected wireless signal is a signal which complies with a predetermined communication protocol, whether the detected wireless signal is a communication signal from the mobile terminal, and the like.

If the received wireless signal is a signal complying with the predetermined communication protocol, the multimedia apparatus 100 may determine that a communication single of the mobile terminal is detected.

For example, the multimedia apparatus 100 may detect a Bluetooth communication signal via the GAP of the Bluetooth communication module 151.

When the communication signal of the mobile terminal is detected (Yes of 1210), the multimedia apparatus 100 determines whether the mobile terminal is a registered communication device (1220).

First, the multimedia apparatus 100 transmits a connection request signal to the mobile terminal and receives a connection accept signal from the mobile terminal.

In order to determine whether the mobile terminal is a registered device, the multimedia apparatus 100 may transmit identification information of the multimedia apparatus 100 to the mobile terminal and receive identification information of the mobile terminal from the mobile terminal.

In addition, the multimedia apparatus 100 may determine whether the mobile terminal is a registered communication device by comparing the received identification information with identification information stored in the memory 115. When the received identification information is identical to the identification information stored in the memory 115, the multimedia apparatus 100 may determine that the mobile terminal is a registered device. When the received identification information is different from the identification information stored in the memory 115, the multimedia apparatus 100 may determine that the mobile terminal is not a registered communication device.

Upon determination that the mobile terminal is a registered communication device (Yes of 1220), the multimedia apparatus 100 establishes a communication with the mobile terminal (1230).

Upon determination that the mobile terminal is a registered communication device, the multimedia apparatus 100 may establish a communication with the mobile terminal without performing a user authentication process. Since the mobile terminal is registered after the user authentication, the multimedia apparatus 100 may determine that the registered mobile terminal is a mobile terminal, the user authentication of which is already performed.

As described above, the multimedia apparatus 100 may automatically establish a communication with the registered mobile terminal without performing the user authentication.

Figure 13:
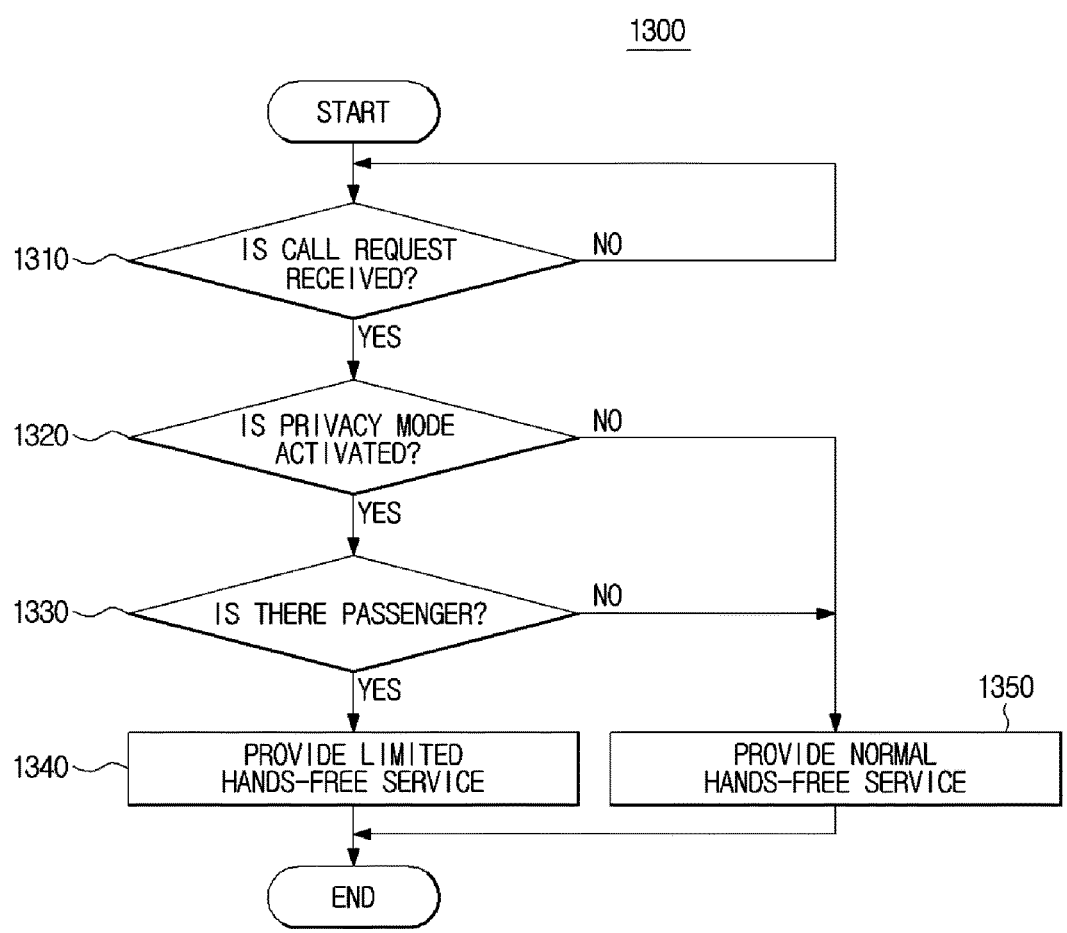
FIG. 13 is a flowchart illustrating a hands-free service provided by a multimedia apparatus according to an exemplary embodiment.

FIG. 13 is a flowchart illustrating a hands-free service provided by a multimedia apparatus according to an exemplary embodiment.

Referring to FIG. 13, a hands-free service (1300) provided by the multimedia apparatus 100 will be described.

The multimedia apparatus 100 determines whether a call request is received (1310).

When the mobile terminal receives a call request from a third party while the multimedia apparatus 100 provides the hands-free service, the mobile terminal transmits a call request reception message to the multimedia apparatus 100. Particularly, when the call request is received from the third party, the mobile terminal does not ring or vibrate but transmits the received call request to the multimedia apparatus 100 via the communication with the multimedia apparatus 100.

When the call request reception message is received from the mobile terminal, the multimedia apparatus 100 may determine that the call request is received.

When the call request is received (Yes of 1310), the multimedia apparatus 100 determines whether the privacy mode is activated (1320).

As described above, the driver may activate or deactivate the privacy mode via the hands-free settings screen 610 displayed on the touchscreen 121. In addition, the multimedia apparatus 100 may store activation or deactivation of the privacy mode selected by the driver in the memory 115.

When the call request reception message is received from the mobile terminal, the multimedia apparatus 100 may determine whether the privacy mode is activated with reference to the memory 115.

Upon determination that the privacy mode is activated (Yes of 1320), the multimedia apparatus 100 determines whether the driver is accompanied by a passenger (1330).

The multimedia apparatus 100 may determine whether the passenger is seated by using various methods.

For example, the multimedia apparatus 100 may collect information related to whether the passenger is seated from various electronic devices included in the vehicle 1 via the CAN communication module 157.

As described above, the driver/passenger protection unit 200 may detect information regarding whether the passenger is seated through the seat belt sensor 220, the seating sensor 230, and the like.

The multimedia apparatus 100 may request the driver/passenger protection unit 200 for sensing results of the seat-belt sensor 220 and the seating sensor 230 via the CAN communication module 157. In addition, the multimedia apparatus 100 may determine whether the passenger is seated based on the sensing results of the seat belt sensor 220 and the seating sensor 230.

Particularly, when the seat-belt sensor 220 of the passenger's seat PS senses that the seat belt is worn or when the seating sensor 230 of the passenger's seat PS senses a weight of the passenger, the multimedia apparatus 100 may determine that the passenger is seated.

For example, the multimedia apparatus 100 may also determine whether the passenger is seated based on a communication signal received via the Bluetooth communication module 151.

Particularly, when the Bluetooth communication module 151 senses a communication signal output from another mobile terminal that is not registered, the multimedia apparatus 100 may determine that the passenger is seated. That is, when a communication signal output from the mobile terminal of the passenger is sensed, the multimedia apparatus 100 may determine that the passenger is seated.

Upon determination that the passenger is seated (Yes of 1330), the multimedia apparatus 100 provides a limited hands-free service (1340).

In the privacy mode, the multimedia apparatus 100 may provide the limited hands-free service in which some of the functions of the hands-free service are limited to the driver.

The limited hands-free service in the privacy mode will be described in more detail later.

In addition, when the privacy mode is deactivated (No of 1320) or when the passenger is not seated (No of 1330), the multimedia apparatus 100 may provide all functions of the hands-free service.

Normal hands-free service will be describe in detail later.

As described above, the multimedia apparatus 100 may limit some of the functions of the hands-free service in accordance with an activation state of the privacy mode and the existence of the passenger.

Figure 14:
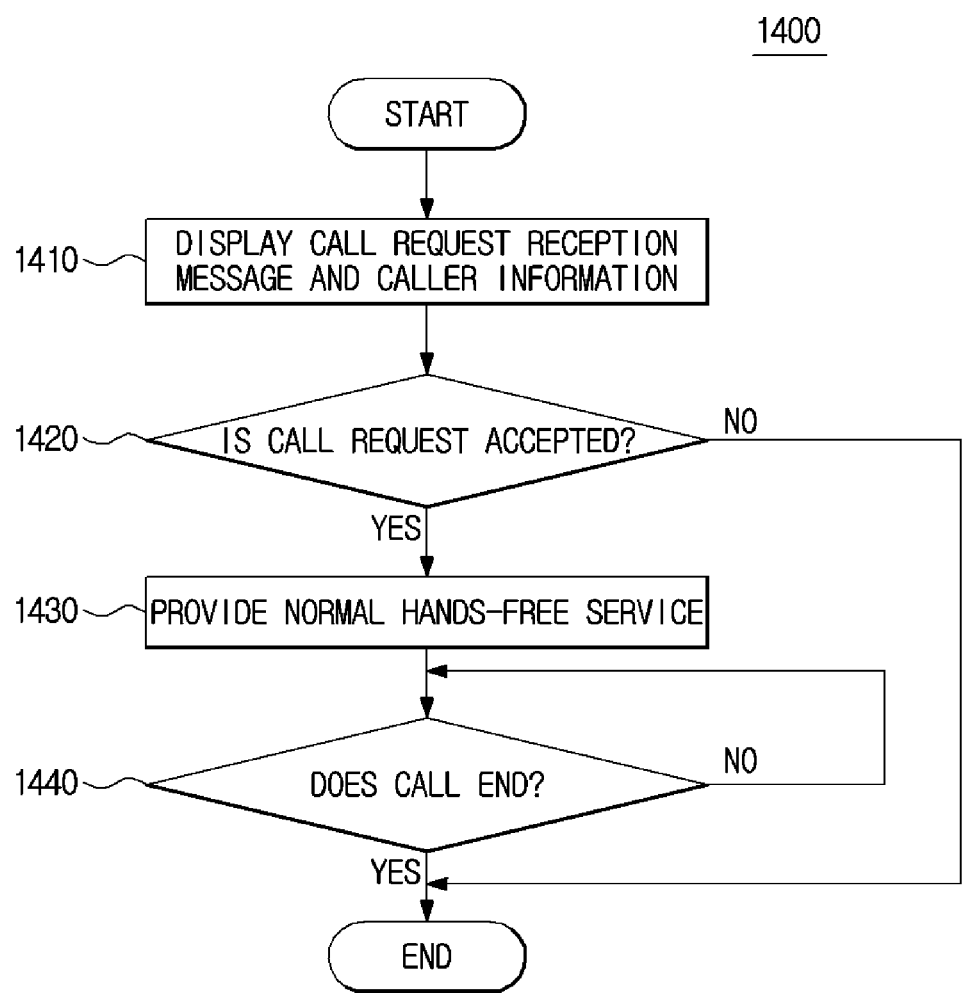
FIG. 14 is a flowchart illustrating a normal hands-free service provided by a multimedia apparatus according to an exemplary embodiment.
Figure 15:
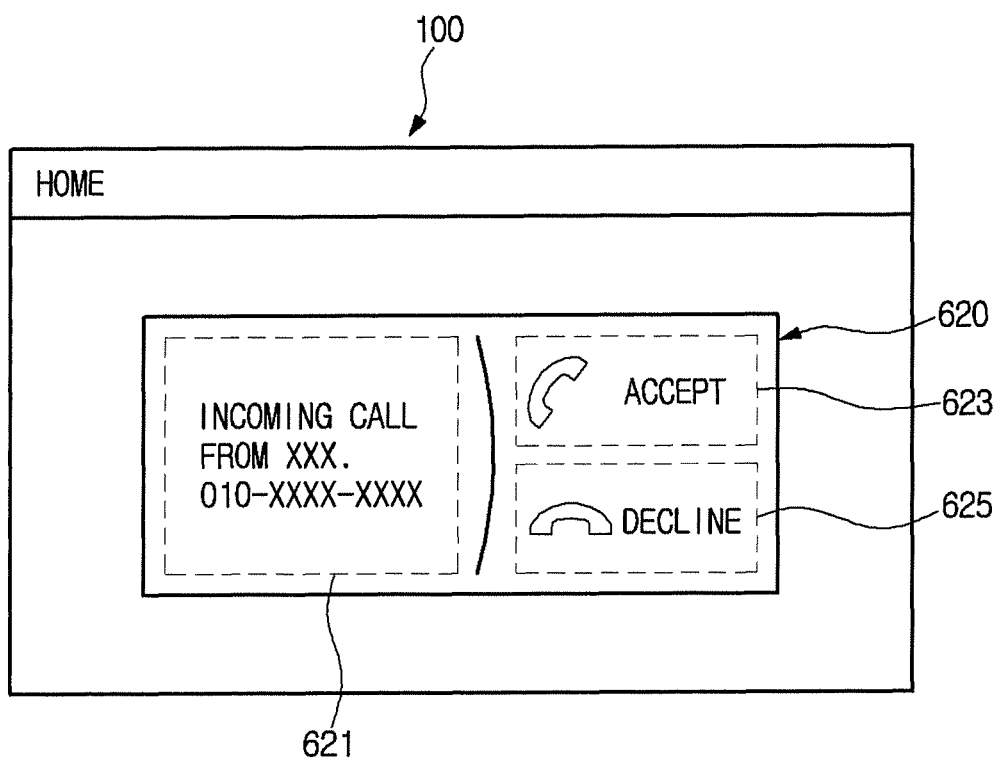
FIG. 15 is a call reception window displayed by a multimedia apparatus according to an exemplary embodiment in a normal hands-free service.
Figure 16:
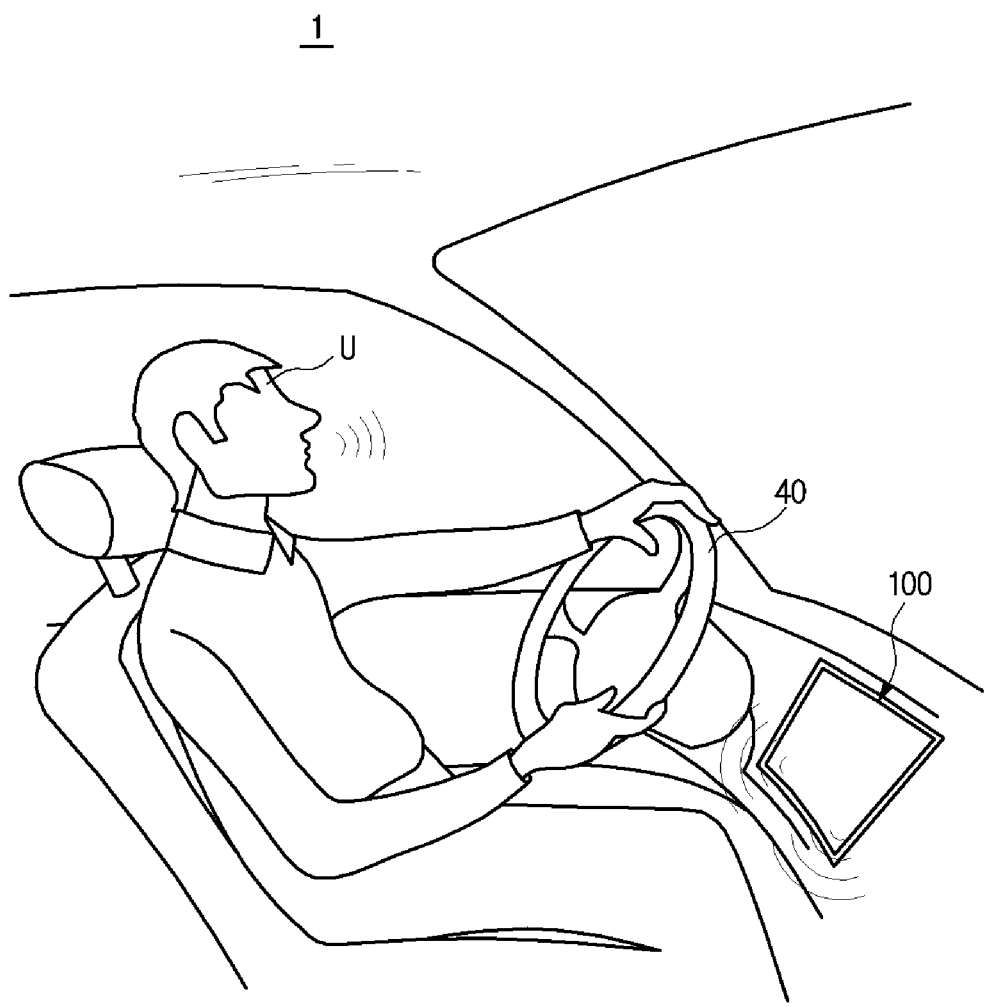
FIG. 16 is a diagram illustrating an example of using a normal hands-free service of a multimedia apparatus according to an exemplary embodiment by a driver.

FIG. 14 is a flowchart illustrating a normal hands-free service provided by a multimedia apparatus according to an exemplary embodiment. FIG. 15 is a call reception window displayed by the multimedia apparatus in the normal hands-free service. FIG. 16 is a diagram illustrating an example of using a normal hands-free service of the multimedia apparatus by a driver.

Referring to FIGS. 14 and 15, a normal hands-free service (1400) provided by the multimedia apparatus 100 will be described.

When the call request reception message is received from the mobile terminal, the multimedia apparatus 100 displays a call request message and caller information (1410).

When the call request is received in the normal hands-free service, the multimedia apparatus 100 may display the call request reception message and the caller information via the touchscreen 121.

For example, the multimedia apparatus 100 may display a first call reception window 620 as illustrated in FIG. 15.

The first call reception window 620 may include a message displaying region 621 to display the call request reception message and the caller information, a call connection accepting region 623 to accept the call connection, and a call connection declining region 625 to decline the call connection. In the message displaying region 621, the call request reception message indicating that the call request is received and the caller information are displayed. The caller information may include a phone number, name, and the like of the caller.

As a result, the driver may identify the call request and the caller via the multimedia apparatus 100 without checking the mobile terminal as illustrated in FIG. 16.

While the call request reception message and the caller information are displayed, the multimedia apparatus 100 determines whether the driver accepts the call connection (1420).

The driver may touch the call connection accepting region 623 or press the call button 123*d* installed on the steering wheel 40 for a shorter period of time to accept the call connection. The driver may also touch the call connection declining region 625 or press the call button 123*d* installed on the steering wheel 40 for a longer period of time to decline the call connection.

When the driver accepts the call connection (Yes of 1420), the multimedia apparatus 100 provides the normal hands-free service to the driver (1430).

Particularly, audio signals of a caller's voice received by the mobile terminal are transmitted to the multimedia apparatus 100 via a communication network, and the multimedia apparatus 100 outputs the received audio signals of the voice through the sound output unit 140.

In addition, a driver's voice is input to the sound input unit 130 of the multimedia apparatus 100 and transmitted to a communication device of the driver.

As a result, the driver may have a telephone conversation by using the multimedia apparatus 100 without using the mobile terminal as illustrating in FIG. 16.

As described above, the multimedia apparatus 100 may provide a variety of functions to the driver in addition to the audio connecting function. For example, the multimedia apparatus 100 may provide functions such as a call request accepting function, a call request declining function, a call ending function, an audio path switching function during a call, and a redialing function via the Bluetooth communication module 151.

The multimedia apparatus 100 determines whether the call ends while providing the normal hands-free service (1440).

The driver may end the call by touching a call ending region displayed on the touchscreen 121 or by pressing the call button 123*d* installed on the steering wheel 40.

When the call ends (Yes of 1440), the multimedia apparatus 100 stops providing the normal hands-free service.

As described above, the multimedia apparatus 100 may display the call request reception message and the caller information and provide an audio function to the driver during the call in the normal hands-free service.

Figure 17:
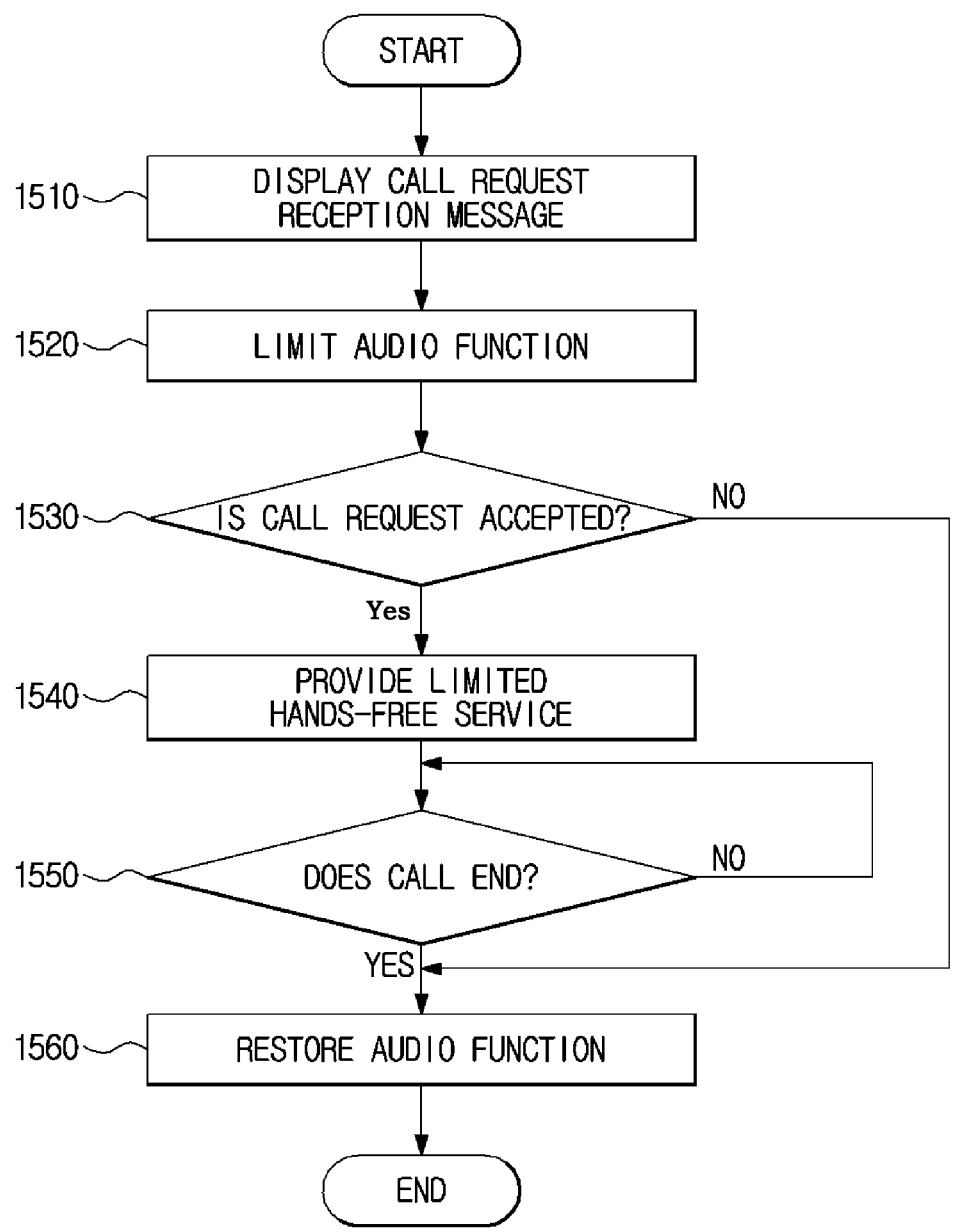
FIG. 17 is a flowchart illustrating an example of a limited hands-free service provided by a multimedia apparatus according to an exemplary embodiment.
Figure 18:
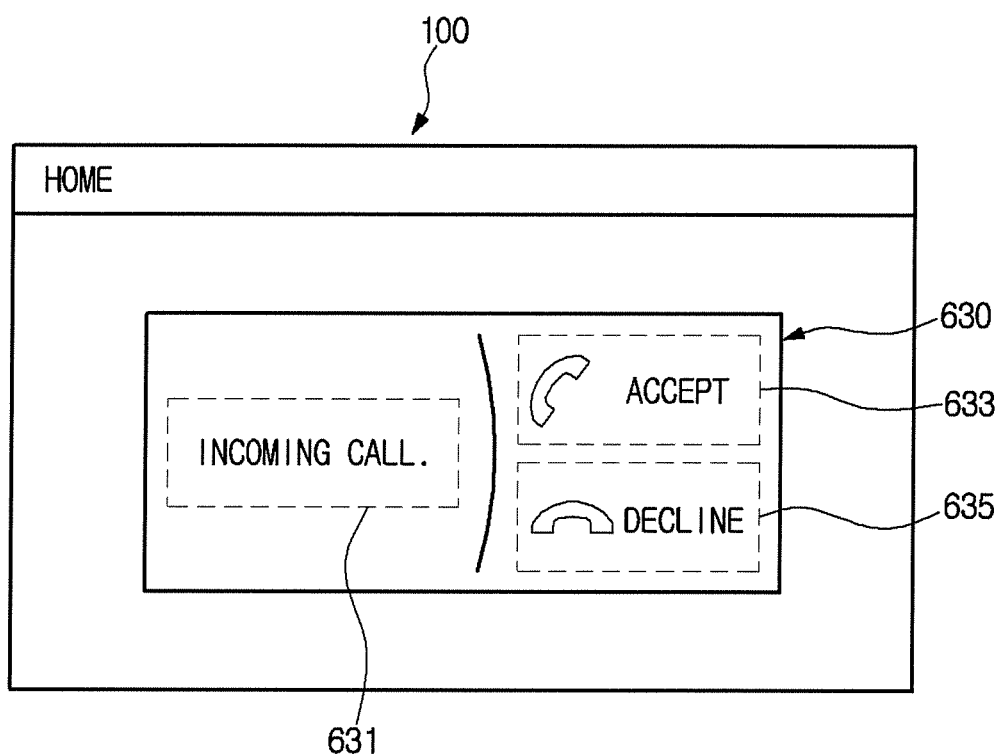
FIG. 18 is a call reception window displayed by a multimedia apparatus according to an exemplary embodiment in a limited hands-free service.
Figure 19:
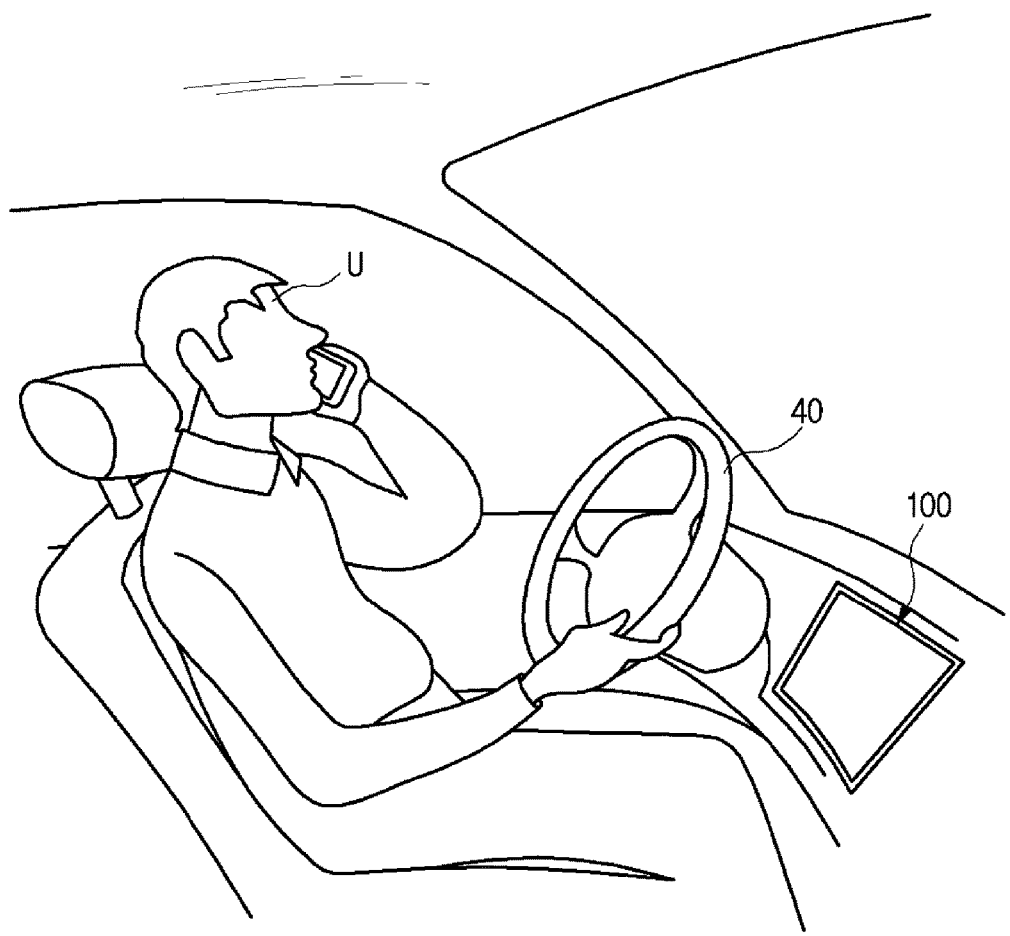
FIG. 19 is a diagram illustrating an example of using a limited hands-free service of a multimedia apparatus according to an exemplary embodiment by a driver.

FIG. 17 is a flowchart illustrating an example of a limited hands-free service provided by a multimedia apparatus according to an exemplary embodiment. FIG. 18 is a call reception window displayed by the multimedia apparatus in the limited hands-free service. FIG. 19 is a diagram illustrating an example of using a limited hands-free service of the multimedia apparatus by a driver.

Referring to FIGS. 17 and 19, a limited hands-free service (1500) provided by the multimedia apparatus 100 will be described.

When the call request reception message is received from the mobile terminal, the multimedia apparatus 100 displays a call request message (1510). When the call request is received in the limited hands-free service, the multimedia apparatus 100 may display only the call request reception message via the touchscreen 121.

For example, the multimedia apparatus 100 may display a second call reception window 630 as illustrated in FIG. 18.

The second call reception window 630 may include a message displaying region 631 to display the call request reception message, a call connection accepting region 633 to accept the call connection, and a call connection declining region 635 to decline the call connection. In the message displaying region 631, only the call request reception message indicating that the call request is received is displayed, and caller information is not displayed.

As a result, the passenger cannot identify the caller so that privacy of the driver may be protected.

Then, the multimedia apparatus 100 limits an audio connection included in the hands-free service (1520).

The audio function refers to a function of outputting the audio signals of the voice transmitted to the mobile terminal via the sound output unit 140 of the multimedia apparatus 100. When the driver is accompanied by a passenger, telephone conversation contents of the driver are exposed to the passenger by the audio function. In the privacy mode, the audio function of the hands-free service may be limited to prevent privacy exposure.

For example, the multimedia apparatus 100 switches an audio path to the mobile terminal by using an audio connection controlling function of the HFP of the Bluetooth communication module 151. The HFP of the Bluetooth communication module 151 may switch the audio path from the multimedia apparatus 100 to the mobile terminal or from the mobile terminal to the multimedia apparatus 100.

When the audio path is switched from the multimedia apparatus 100 to the mobile terminal, the mobile terminal may output a caller's voice and receive a driver's voice.

For example, the multimedia apparatus 100 may also release the audio connection to the mobile terminal by using the audio connection controlling function of the HFP of the Bluetooth communication module 151.

As described above, although the audio connection between the mobile terminal and the multimedia apparatus 100 is released, the communication between the mobile terminal and the multimedia apparatus 100 is not terminated. In other words, the Bluetooth communication module 151 may release only the audio connection while maintaining the communication between the mobile terminal and the multimedia apparatus 100.

As a result, the mobile terminal may output the caller's voice and receive the driver's voice.

Then, the multimedia apparatus 100 determines whether the driver accepts the call connection (1530).

The driver may touch the call connection accepting region 623 or press the call button 123d installed on the steering wheel 40 for a shorter period of time to accept the call connection. The driver may also touch the call connection declining region 625 or press the call button 123d installed on the steering wheel 40 for a longer period of time to decline the call connection.

When the driver accepts the call connection (Yes of 1530), the multimedia apparatus 100 provides the limited hands-free service to the driver (1540).

Particularly, the mobile terminal outputs audio signals of a caller's voice, receives the driver's voice, and transmits the driver's voice to the caller. In other words, the audio function does not operate among the functions of the hands-free service.

As a result, the driver may have a telephone conversation by using the mobile terminal as illustrated in FIG. 19. In addition, the telephone conversation contents between the driver and the caller are not exposed to the passenger, thereby protecting privacy of the driver.

In addition, the other functions of the hands-free service except for the audio function are performed unchanged. For example, the multimedia apparatus 100 may provide the call request accepting function, the call request declining function, the call ending function, and the redialing function via the Bluetooth communication module 151.

In addition, services using the other profiles of the Bluetooth communication module 151 may be provided unchanged. For example, although the audio connection of the HFP is released while the multimedia apparatus 100 provides an audio streaming service by using the audio/video streaming profile (AVRCP) of the Bluetooth communication module 151, the audio streaming service of the AVRCP may be continuously provided.

While providing the limited hands-free service, the multimedia apparatus 100 determines whether the call ends (1550).

The driver may end the call by touching a call ending region displayed on the touchscreen 121 or by pressing the call button 123d installed on the steering wheel 40.

When the call ends (Yes of 1550), the multimedia apparatus 100 restores the audio connection included in the hands-free service (1560).

For example, the multimedia apparatus 100 may recover the audio path from the mobile terminal by using the audio connection controlling function of the HFP of the Bluetooth communication module 151.

For example, the multimedia apparatus 100 may also create an audio connection with the mobile terminal.

As a result, when the privacy mode is deactivated or when the passenger is not seated, the multimedia apparatus 100 may provide the normal hands-free service.

Then, the multimedia apparatus 100 stops providing the normal hands-free service.

As described above, the multimedia apparatus 100 may display only the call request reception message and limits the audio function in the limited hands-free service.

Figure 20:
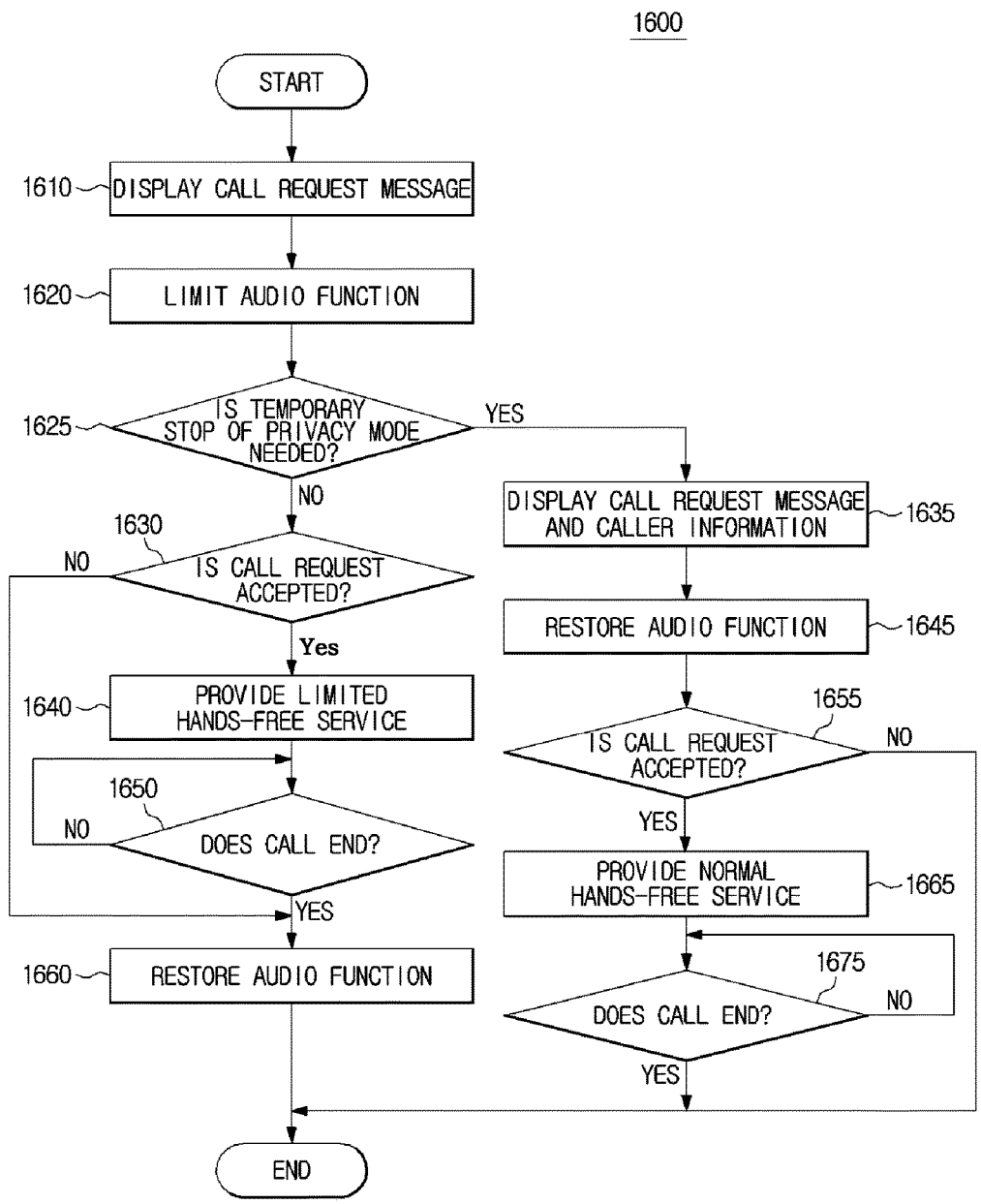
FIG. 20 is a flowchart illustrating another example of a limited hands-free service provided by a multimedia apparatus according to an exemplary embodiment.

FIG. 20 is a flowchart illustrating another example of the limited hands-free service provided by the multimedia apparatus according to an exemplary embodiment.

Referring to FIG. 20, a limited hands-free service (1600) provided by the multimedia apparatus 100 will be described.

When the call request reception message is received from the mobile terminal, the multimedia apparatus 100 displays a call request message (1610).

When the call request is received in the limited hands-free service, the multimedia apparatus 100 may display only the call request reception message via the touchscreen 121.

Then, the multimedia apparatus 100 limits an audio connection included in the hands-free service (1620).

In this regard, the audio function refers to a function of outputting the audio signals of the voice transmitted to the mobile terminal via the sound output unit 140 of the multimedia apparatus 100.

For example, the multimedia apparatus 100 switches an audio path to the mobile terminal by using an audio connection controlling function of the HFP of the Bluetooth communication module 151.

For example, the multimedia apparatus 100 may also release the audio connection to the mobile terminal by using the audio connection controlling function of the HFP of the Bluetooth communication module 151.

Then, the multimedia apparatus 100 determines whether to temporarily stop the privacy mode (1625).

Although the privacy mode is activated and the passenger is seated, privacy of the driver may not be invaded. For example, if the driver and the passenger are close friends or when the passenger cannot understand the telephone conversation, the driver may temporarily stop the privacy mode.

Particularly, the driver may temporarily stop the privacy mode by, for example, touching the call connection accepting region 623 at least twice within a predetermined time interval or by pressing the call button 123d at least twice within a predetermined time interval.

When the privacy mode is not temporarily stopped (No of 1625), the multimedia apparatus 100 determines whether the driver accepts the call connection (1630).

When the driver accepts the call connection (Yes of 1630), the multimedia apparatus 100 provides the limited hands-free service to the driver (1640).

In addition, while providing the limited hands-free service, the multimedia apparatus 100 determines whether the call ends (1650).

When the call ends (Yes of 1650), the multimedia apparatus 100 restores the audio connection included in the hands-free service (1660).

Then, the multimedia apparatus 100 stops providing the normal hands-free service.

When the privacy mode is temporarily stopped (Yes of 1625), the multimedia apparatus 100 displays the call request reception message and caller information (1635).

When the privacy mode is temporarily stopped, there is no risk of invasion of privacy, and thus the multimedia apparatus 100 may display the caller information together with the call request reception message via the touchscreen 121.

Then, the multimedia apparatus 100 restores the audio connection included in the hands-free service (1645).

When the call ends, the multimedia apparatus 100 restores the audio connection to the mobile terminal which is limited while the driver has a telephone conversation.

For example, the multimedia apparatus 100 may recover the audio path from the mobile terminal by using the audio connection controlling function of the HFP of the Bluetooth communication module 151.

For example, the multimedia apparatus 100 may also create an audio connection to the mobile terminal.

As a result, the multimedia apparatus 100 may provide a normal hands-free service.

While the call request reception message and the caller information are displayed, the multimedia apparatus 100 determines whether the driver accepts the call connection (1655).

The driver may accept the call connection by touching the call connection accepting region 623 or by pressing the call button 123d installed on the steering wheel 40 for a shorter period of time. Also, the driver may decline the call connection by touching the call connection declining region 625 or by pressing the call button 123d installed on the steering wheel 40 for a longer period of time.

When the driver accepts the call connection (Yes of 1655), the multimedia apparatus 100 provides the normal hands-free service to the driver (1665).

Particularly, audio signals of the voice received by the mobile terminal are transmitted to the multimedia apparatus 100 via a communication, and the multimedia apparatus 100 outputs the received audio signals via the sound output unit 140.

In addition, the voice of the driver is input via the sound input unit 130 of the multimedia apparatus 100 and transmitted to a communication device of the driver.

While the normal hands-free service is provided, the multimedia apparatus 100 determines whether the call ends (1675).

The driver may end the call by touching the call ending region displayed on the touchscreen 121 or by pressing the call button 123d installed on the steering wheel 40.

When the call ends (Yes of 1675), the multimedia apparatus 100 stops providing the normal hands-free service.

As described above, the multimedia apparatus 100 may temporarily stop the privacy mode and provide the normal hands-free service in accordance with the driver's selection.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle, comprising:
    a touchscreen configured to receive a touch input of a driver and display image information corresponding to the touch input;
    a passenger sensing unit configured to sense whether a passenger is present in the vehicle;
    a communication unit configured to communicate with a mobile terminal of the driver; and
    a controller configured to selectively display a call request reception message and identification information of a third party on the touchscreen when a call request is received from the third party via the mobile terminal and to activate an audio function of a hands-free service,
    wherein when a privacy mode is activated and the passenger sensing unit senses that the passenger is present in the vehicle, the controller displays the call request reception message, prevents displaying of the identification information of the third party, and deactivates the audio function of the hands-free service, and
    the passenger sensing unit comprises at least one selected from the group consisting of a seat belt sensor installed at a seat and configured to sense whether the passenger wears a seat belt and a seating sensor installed at the seat and configured to sense whether the passenger is present.

2. The vehicle according to claim 1, wherein the controller blocks an audio path for the audio function while maintaining a communication with the mobile terminal in the privacy mode.

3. The vehicle according to claim 1, wherein the hands-free service comprises the audio function between the mobile terminal and the vehicle, a call request accepting function via the vehicle, a call request declining function via the vehicle, and a call ending function via the vehicle.

4. The vehicle according to claim 3, wherein the controller blocks the audio function while maintaining the call request accepting function, the call request declining function, and the call ending function in the privacy mode.

5. The vehicle according to claim 1, wherein the controller switches an audio path for the audio function to the mobile terminal while maintaining a communication with the mobile terminal in the privacy mode.

6. The vehicle according to claim 1, wherein the controller restores the audio function when the call with the third party ends.

7. The vehicle according to claim 1, wherein when the passenger sensing unit senses the presence of the passenger and the call request is received from the third party in the privacy mode, the controller deactivates the privacy mode in accordance with a selection of the driver.

8. The vehicle according to claim 7, wherein, when the privacy mode is deactivated, the controller displays the call request reception message and identification information of the third party and restores the audio function.

9. The vehicle according to claim 8, wherein, when the call with the third party ends, the controller activates the privacy mode.

10. A method of controlling a vehicle, the method comprising:
    establishing a communication between the vehicle and a mobile terminal;
    displaying a call request reception message and identification information of a third party and providing an audio function of a hands-free service when a call request of the third party is received via the mobile terminal;
    sensing, by a passenger sensing unit comprising at least one selected from the group consisting of a seat belt sensor installed at a seat and configured to sense whether a passenger wears a seat belt and a seating sensor installed at the seat and configured to sense whether the passenger is present, the passenger in the vehicle when a privacy mode is activated; and displaying the call request reception message, preventing the displaying of the identification information of the third party and blocking the audio function of the hands-free service, when the privacy mode is activated and the passenger in the vehicle is sensed.

11. The method according to claim 10, wherein the limiting blocking of the audio function comprises blocking an audio path for the audio function while maintaining the communication with the mobile terminal.

12. The method according to claim 10, wherein the limiting blocking of the audio function comprises switching the audio path for the audio function to the mobile terminal while maintaining the communication with the mobile terminal.

13. The method according to claim 10, wherein the hands-free service comprises the audio function between the mobile terminal and the vehicle, a call request accepting function via the vehicle, a call request declining function via the vehicle, and a call ending function via the vehicle.

14. The method according to claim 13, wherein the limiting blocking of the audio function comprises limiting the audio function while maintaining the call request accepting function, the call request declining function, and the call ending function.

15. The method according to claim 10, further comprising restoring the audio function when a call with the third party ends.

16. The method according to claim 10, further comprising deactivating the privacy mode in accordance with a selection of the driver when the presence of the passenger is sensed and a call request of a third party is received in the privacy mode.

17. The method according to claim 16, further comprising displaying the call request reception message and identification information of the third party and restoring the audio function when the privacy mode is deactivated.

18. The method according to claim 17, further comprising activating the privacy mode when a call with the third party ends.

19. A multimedia apparatus installed in a vehicle, the multimedia apparatus comprising:

a touchscreen configured to receive a touch input of a driver and display image information corresponding to the touch input;

a communication unit configured to communicate with a mobile terminal of the driver and receive, from a passenger sensing unit comprising at least one selected from the group consisting of a seat belt sensor installed at a seat and configured to sense whether a passenger wears a seat belt and a seating sensor installed at the seat and configured to sense whether the passenger is present, information regarding whether the passenger is present in the vehicle; and a controller configured to display a call request reception message and identification information of a third party when a call request is received from the third party via the mobile terminal and to provide an audio function of a hands-free service, wherein when a privacy mode is activated and the received information indicates that the passenger is present in the vehicle, the controller displays the call request reception message, prevents displaying of the identification information of the third party, and blocks the audio function of the hands-free service.

20. The multimedia apparatus according to claim 19, wherein the controller blocks an audio path for the audio function while maintaining a communication with the mobile terminal in the privacy mode.

21. The multimedia apparatus according to claim 19, wherein the controller switches an audio path for the audio function to the mobile terminal while maintaining a communication with the mobile terminal in the privacy mode.

22. The multimedia apparatus according to claim 19, wherein the controller restores the audio function when the call with the third party ends.

* * * * *